United States Patent
Onozaki et al.

(10) Patent No.: US 10,955,765 B2
(45) Date of Patent: Mar. 23, 2021

(54) MAGNETIC CARRIER AND TWO-COMPONENT DEVELOPER

(71) Applicant: CANON KABUSHIKI KAISHA, Tokyo (JP)

(72) Inventors: Yuto Onozaki, Saitama (JP); Ichiro Kanno, Kashiwa (JP); Ryo Nakajima, Nagareyama (JP); Kazuyuki Sakamoto, Noda (JP); Nozomu Komatsu, Toride (JP); Takakuni Kobori, Toride (JP); Hiroyuki Fujikawa, Yokohama (JP)

(73) Assignee: CANON KABUSHIKI KAISHA, Toyko (JP)

( * ) Notice: Subject to any disclaimer, the term of this patent is extended or adjusted under 35 U.S.C. 154(b) by 0 days.

(21) Appl. No.: 16/686,760

(22) Filed: Nov. 18, 2019

(65) Prior Publication Data
US 2020/0166862 A1 May 28, 2020

(30) Foreign Application Priority Data

Nov. 22, 2018 (JP) .............................. JP2018-218795
Oct. 18, 2019 (JP) .............................. JP2019-191345

(51) Int. Cl.
| | |
|---|---|
| *G03G 9/113* | (2006.01) |
| *G03G 9/107* | (2006.01) |
| *C08F 220/18* | (2006.01) |
| *C08K 3/11* | (2018.01) |
| *C08F 212/08* | (2006.01) |
| *C08F 265/06* | (2006.01) |
| *C09D 125/14* | (2006.01) |

(52) U.S. Cl.
CPC .......... *G03G 9/1075* (2013.01); *C08F 212/08* (2013.01); *C08F 220/18* (2013.01); *C08F 265/06* (2013.01); *C08K 3/11* (2018.01); *C09D 125/14* (2013.01); *G03G 9/1133* (2013.01); *G03G 9/1139* (2013.01); *C08F 220/1804* (2020.02); *C08F 220/1806* (2020.02)

(58) Field of Classification Search
CPC ..... G03G 9/1139; G03G 9/1133; G03G 9/113
See application file for complete search history.

(56) References Cited

U.S. PATENT DOCUMENTS

| | | | |
|---|---|---|---|
| 4,301,224 A * | 11/1981 | Kozima | ............... G03G 5/0525 430/134 |
| 5,424,810 A | 6/1995 | Tomiyama et al. | |
| 5,464,722 A | 11/1995 | Tomiyama et al. | |
| 5,700,616 A | 12/1997 | Kasuya et al. | |
| 5,712,073 A | 1/1998 | Katada et al. | |
| 5,968,701 A | 10/1999 | Onuma et al. | |
| 5,972,553 A | 10/1999 | Katada et al. | |
| 6,002,895 A | 12/1999 | Kasuya et al. | |
| 6,007,957 A | 12/1999 | Kobori et al. | |
| 6,020,102 A | 2/2000 | Fujimoto et al. | |
| 6,120,961 A | 9/2000 | Tanikawa et al. | |
| 6,156,471 A | 12/2000 | Kobori et al. | |
| 6,203,959 B1 | 3/2001 | Tanikawa et al. | |
| 6,235,441 B1 | 5/2001 | Tanikawa et al. | |
| 6,653,036 B1 | 11/2003 | Tanikawa et al. | |
| 6,670,087 B2 | 12/2003 | Fujikawa et al. | |
| 6,751,424 B2 | 6/2004 | Komatsu et al. | |
| 6,808,852 B2 | 10/2004 | Hotta et al. | |
| 6,905,808 B2 | 6/2005 | Itakura et al. | |
| 7,112,395 B2 | 9/2006 | Ida et al. | |
| 7,147,980 B2 | 12/2006 | Itakura et al. | |
| 7,147,981 B2 | 12/2006 | Fujikawa et al. | |
| 7,279,262 B2 | 10/2007 | Fujikawa et al. | |
| 7,288,348 B2 | 10/2007 | Hayami et al. | |
| 7,297,455 B2 | 11/2007 | Fujikawa et al. | |
| 7,300,733 B2 | 11/2007 | Sugahara et al. | |
| 7,361,441 B2 | 4/2008 | Itakura et al. | |
| 7,396,626 B2 | 7/2008 | Fujikawa et al. | |
| 7,396,629 B2 | 7/2008 | Baba et al. | |
| 7,442,478 B2 | 10/2008 | Itakura et al. | |

(Continued)

FOREIGN PATENT DOCUMENTS

| | | | |
|---|---|---|---|
| JP | 2009163026 A | * | 7/2009 |
| JP | 2010-014854 | | 1/2010 |

(Continued)

OTHER PUBLICATIONS

English language machine translation of JP 2009-163026 (Year: 2009).*

(Continued)

*Primary Examiner* — Christopher D RoDee
(74) *Attorney, Agent, or Firm* — Venable LLP

(57) ABSTRACT

A magnetic carrier comprising a magnetic carrier particle having a magnetic carrier particle having a magnetic carrier core particle and a resin coat layer formed on the magnetic carrier core particle surface, and inorganic fine particles A present on a surface of the magnetic carrier particle, wherein each of the inorganic fine particles A has a rectangular parallelepiped particle shape, the inorganic fine particles A have D1 of 10 to 60 nm, the inorganic fine particles A are inorganic particles which have been surface treated with a surface treatment agent or silane coupling agent-treated particles, SP1 of the resin coat layer and SP2 of the surface treatment agent satisfies SP1−SP2≤14.00, and the coverage ratio of the magnetic carrier surface by the inorganic fine particles A as measured by ESCA is 5.0 to 20.0 atom %: and a two-component developer comprising at least the magnetic carrier and a toner.

10 Claims, 2 Drawing Sheets

(56) References Cited

U.S. PATENT DOCUMENTS

| | | |
|---|---|---|
| 7,452,647 B2 | 11/2008 | Hayami et al. |
| 7,611,813 B2 | 11/2009 | Ida et al. |
| 7,855,042 B2 | 12/2010 | Kobori et al. |
| 7,858,283 B2 | 12/2010 | Ishigami et al. |
| 7,927,775 B2 | 4/2011 | Komatsu et al. |
| 7,939,233 B2 | 5/2011 | Inoue et al. |
| 8,137,886 B2 | 3/2012 | Baba et al. |
| 8,142,972 B2 | 3/2012 | Hotta et al. |
| 8,288,069 B2 | 10/2012 | Fujikawa et al. |
| 8,455,168 B2 | 6/2013 | Kiyono et al. |
| 8,986,914 B2 | 3/2015 | Fujikawa et al. |
| 9,034,549 B2 | 5/2015 | Shiotari et al. |
| 9,058,924 B2 | 6/2015 | Komatsu et al. |
| 9,063,443 B2 | 6/2015 | Ishigami et al. |
| 9,152,088 B1 | 10/2015 | Kobori et al. |
| 9,348,253 B2 | 5/2016 | Kanno et al. |
| 9,372,420 B2 | 6/2016 | Mizo et al. |
| 9,417,540 B2 | 8/2016 | Hashimoto et al. |
| 9,500,975 B2 | 11/2016 | Sugahara et al. |
| 9,594,323 B2 | 3/2017 | Fujikawa et al. |
| 9,599,920 B2 | 3/2017 | Sugahara et al. |
| 9,651,883 B2 | 5/2017 | Hama et al. |
| 9,665,021 B2 | 5/2017 | Ohtsu et al. |
| 9,665,026 B2 | 5/2017 | Iwasaki et al. |
| 9,671,707 B2 | 6/2017 | Minagawa et al. |
| 9,778,598 B2 | 10/2017 | Onozaki et al. |
| 9,958,809 B2 | 5/2018 | Sugahara et al. |
| 10,036,970 B2 | 7/2018 | Kanno et al. |
| 10,082,743 B2 | 9/2018 | Hama et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,274,851 B2 | 4/2019 | Hashimoto et al. |
| 10,401,748 B2 | 9/2019 | Hashimoto et al. |
| 10,423,086 B2 | 9/2019 | Hama et al. |
| 10,451,986 B2 | 10/2019 | Sano et al. |
| 10,474,049 B2 | 11/2019 | Onozaki et al. |
| 10,564,560 B2 | 2/2020 | Onozaki et al. |
| 2007/0031750 A1* | 2/2007 | Tanaka ............... G03G 9/1131 430/111.1 |
| 2009/0246675 A1 | 10/2009 | Nakamura et al. |
| 2010/0028796 A1 | 2/2010 | Nakamura et al. |
| 2010/0183971 A1 | 7/2010 | Fujikawa et al. |
| 2013/0244159 A1 | 9/2013 | Ishigami et al. |
| 2014/0137428 A1 | 5/2014 | Takenaka et al. |
| 2014/0329176 A1 | 11/2014 | Kanno et al. |
| 2016/0109820 A1 | 4/2016 | Hashimoto et al. |
| 2018/0118953 A1* | 5/2018 | Aoyama ............... C08F 299/08 |
| 2018/0314176 A1 | 11/2018 | Ikeda et al. |
| 2019/0171125 A1 | 6/2019 | Kanno et al. |
| 2019/0339629 A1 | 11/2019 | Yamashita et al. |
| 2019/0384202 A1* | 12/2019 | Shirayama ......... G03G 9/08706 |
| 2020/0096888 A1* | 3/2020 | Anno .................. G03G 9/0808 |

FOREIGN PATENT DOCUMENTS

| | | |
|---|---|---|
| JP | 2011-203690 | 10/2011 |
| JP | 2017-122878 | 7/2017 |
| JP | 2018-049239 | 3/2018 |

OTHER PUBLICATIONS

U.S. Appl. No. 16/550,410, filed Aug. 26, 2019, Masayuki Hama.
U.S. Appl. No. 16/701,265, filed Dec. 3, 2019, Ichiro Kanno.
Harazaki, "Basic Coating Science" ISBN-10: 4837504299, ISBN-13: 978-4837504290 (1977) 54-57 (English Translation of Table 3-9 in pp. 55 to 56, Energies of Vaporization and Molar volumes (25° C.) of Atoms and Atomic Groups by Fedors).

* cited by examiner

HIGHER MOLECULAR WEIGHT SIDE

HIGHER MOLECULAR WEIGHT SIDE

MAGNETIC CARRIER AND TWO-COMPONENT DEVELOPER

BACKGROUND OF THE INVENTION

Field of the Invention

The present invention relates to a magnetic carrier and two-component developer to be used in image-forming methods to develop electrostatic images using electrophotographic methods.

Description of the Related Art

Methods of forming an electrostatic latent image by various methods on an electrostatic latent image bearing member and affixing a toner to the electrostatic latent image to develop the electrostatic latent image are commonly used as electrophotographic image-forming methods. Two-component developing systems in which a carrier particle called a magnetic carrier is mixed with a toner and triboelectrically charged to give the toner a suitable positive or negative charge, and this charge is used as a driving force to develop the image, are widely used for such development.

One advantage of two-component developing systems is that functions such as developer mixing, transportation and charging can be assigned to the magnetic carrier, allowing for good control of developing performance because the carrier and toner are functionally distinct.

As electrophotographic full-color copiers have proliferated in recent years, there has been demand for even greater image quality as well as stability during long-term use.

To achieve greater image quality, it is essential to achieve high image reproducibility in the processes of development, transfer and fixing, and in the transfer process in particular it is possible to achieve a high level of image reproducibility by efficiently transferring the toner developed on the electrostatic latent image bearing member to an intermediate transfer member or medium.

To achieve high transferability, the strength of the electrical field that individual toner particles are subjected to by transfer bias must be greater than the attachment force between the toner and the electrostatic latent image bearing member. Attachment force is broadly classified into non-electrostatic attachment force such as Van der Waals force and electrostatic attachment force such as electrostatic mirror force.

Thus, Japanese Patent Application Publication No. 2018-49239 reports on means for reducing non-electrostatic attachment force by coating a toner particle with a large amount of an additive such as a silica particle in order to increase transferability.

SUMMARY OF THE INVENTION

The problem of transferability is improved by the toner and two-component developer described in Japanese Patent Application Publication No. 2018-49239.

However, during long-term use a part of the additive may move from the toner particle surface and attach to the magnetic carrier. It has been found that the magnetic carrier is contaminated and charge-providing ability declines as a result, detracting from the durable stability of the image density and causing fogging and density non-uniformity within the image plane.

Thus, there is a trade-off relationship between transferability and the contamination resistance of the magnetic carrier, and there is urgent demand for a magnetic carrier and two-component developer that can resolve this trade-off and provide high image quality even during long-term use.

The present invention provides a magnetic carrier and two-component developer whereby such problems are resolved. Specifically, it provides a magnetic carrier and two-component developer with excellent durable stability of image density, whereby fogging and density non-uniformity within the image plane can be controlled.

The inventors discovered that excellent durable stability of image density could be achieved and fogging and density non-uniformity within the image plane could be controlled by using a magnetic carrier and two-component developer such as those described below.

That is, the present invention relates to a magnetic carrier comprising:

a magnetic carrier particle having a magnetic carrier core particle and a resin coat layer formed on the surface of the magnetic carrier core particle; and inorganic fine particles A present on a surface of the magnetic carrier particle, wherein each of the inorganic fine particles A has a rectangular parallelepiped particle shape, the inorganic fine particles A have a number-average particle diameter (D1) of 10 nm to 60 nm, the inorganic fine particles A are inorganic particles which have been surface treated with a surface treatment agent, the solubility parameter (SP1) of the resin coat layer $(J/mol)^{1/2}$ and the solubility parameter (SP2) $(J/mol)^{1/2}$ of the surface treatment agent are in the relationship shown by Formula (1), and the coverage ratio of the magnetic carrier surface by the inorganic fine particles A as measured by ESCA is 5.0 atom % to 20.0 atom %:

$$SP1-SP2<14.00 \tag{1}$$

Moreover, the present invention relates to a two-component developer comprising at least the magnetic carrier of the present invention and a toner.

Further, the present invention relates to a magnetic carrier comprising:

a magnetic carrier particle having a magnetic carrier core particle and a resin coat layer formed on the surface of the magnetic carrier core particle; and inorganic fine particles A present on a surface of the magnetic carrier particle, wherein each of the inorganic fine particles A has a rectangular parallelepiped particle shape, the inorganic fine particles A have a number-average particle diameter (D1) of 10 nm to 60 nm, the inorganic fine particles A are silane coupling agent-treated particles, the solubility parameter (SP1) of the resin coat layer $(J/mol)^{1/2}$ and the solubility parameter (SP2) $(J/mol)^{1/2}$ of the silane coupling agent are in the relationship shown by Formula (1), and the coverage ratio of the magnetic carrier surface by the inorganic fine particles A as measured by ESCA is 5.0 atom % to 20.0 atom %:

$$SP1-SP2 \leq 14.00 \tag{1}$$

According to the present invention, a magnetic carrier and two-component developer, which can achieve excellent durable stability of image density and which can control fogging and density non-uniformity within the image plane, can be obtained.

Further features of the present invention will become apparent from the following description of exemplary embodiments with reference to the attached drawings.

DESCRIPTION OF THE EMBODIMENTS

Figure 1:
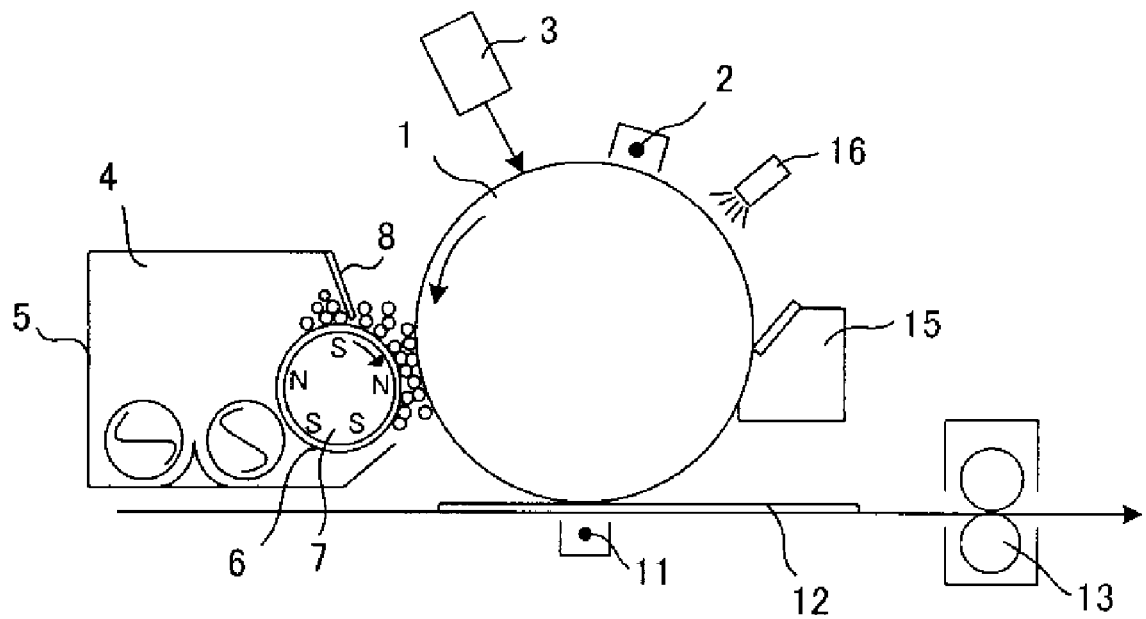
FIG. 1 is a schematic view of an image-forming device using the invention.

Embodiments of the present invention are described below.

The magnetic carrier of the present invention is a magnetic carrier comprising:

a magnetic carrier particle having a magnetic carrier core particle and a resin coat layer formed on the surface of the magnetic carrier core particle; and inorganic fine particles A present on a surface of the magnetic carrier particle, wherein each of the inorganic fine particles A has a rectangular parallelepiped particle shape, the inorganic fine particles A have a number-average particle diameter (D1) of 10 nm to 60 nm, the inorganic fine particles A are inorganic particles which have been surface treated with a surface treatment agent, the solubility parameter (SP1) of the resin coat layer $(J/mol)^{1/2}$ and the solubility parameter (SP2) $(J/mol)^{1/2}$ of the surface treatment agent are in the relationship shown by Formula (1), and the coverage ratio of the magnetic carrier surface by the inorganic fine particles A as measured by ESCA is 5.0 atom % to 20.0 atom %:

$$SP1-SP2 \leq 14.00 \quad (1)$$

Moreover, the magnetic carrier of the present invention is a magnetic carrier comprising:

a magnetic carrier particle having a magnetic carrier core particle and a resin coat layer formed on the surface of the magnetic carrier core particle; and inorganic fine particles A present on a surface of the magnetic carrier particle, wherein each of the inorganic fine particles A has a rectangular parallelepiped particle shape, the inorganic fine particles A have a number-average particle diameter (D1) of 10 nm to 60 nm, the inorganic fine particles A are silane coupling agent-treated particles, the solubility parameter (SP1) of the resin coat layer $(J/mol)^{1/2}$ and the solubility parameter (SP2) $(J/mol)^{1/2}$ of the silane coupling agent are in the relationship shown by Formula (1), and the coverage ratio of the magnetic carrier surface by the inorganic fine particles A as measured by ESCA is 5.0 atom % to 20.0 atom %:

$$SP1-SP2 \leq 14.00 \quad (1)$$

Contamination of the magnetic carrier by additives from the toner and contamination of the magnetic carrier surface by the toner particle itself can be controlled by providing inorganic fine particles A on the surface of the magnetic carrier particle. We arrived at the present invention after discovering that stable charging performance and excellent durability during long-term use could be maintained as a result.

The reasons why the above problems are resolved in the present invention is thought to be as follows.

Presenting inorganic fine particles A on the surface of the magnetic carrier particle reduces the points of contact with the toner, thereby reducing the attachment force between the toner and the magnetic carrier. It is thought that this reduces contamination of the magnetic carrier surface by mitigating impacts to the magnetic carrier from additives released from the toner and from toner particles. As a result, it is thought that stable charging performance and durability can be maintained during long-term use in high-temperature, high-humidity environments.

It is also thought that the Van der Waals force between the inorganic fine particles A and the magnetic carrier particle is increased if the inorganic fine particles A each have a rectangular parallelepiped particle shape. It is thought that this makes the inorganic fine particles A less likely to detach, so that it can maintain the effect of reducing the attachment force with the toner.

The rectangular parallelepiped particle content of the inorganic fine particles A is preferably 60 number % to 100 number %, or more preferably 65 number % to 100 number %. The rectangular parallelepiped particle content of the inorganic fine particles A here is the ratio of the number of particles having a rectangular parallelepiped particle shape to 1,000 inorganic fine particles A having a particle diameter of 10 nm to 60 nm.

The particle shape of the inorganic fine particles A is preferably not just a rectangular parallelepiped shape but a cubic shape. A cubic shape or rectangular parallelepiped shape need not be a perfect cube or rectangular parallelepiped shape, and for example these include approximately cubic or rectangular parallelepiped shapes in which some corners are missing or rounded. The aspect ratio of the inorganic fine particles is preferably 1.0 to 3.0.

The particle shape or rectangular parallelepiped particle content of the inorganic fine particles A can be adjusted by conditions and operations that increase the particle crystallinity. To increase the content of cubic particles and rectangular parallelepiped particles, for example, it is desirable to reduce the mechanic stress during the crystal growth step.

The number-average particle diameter (D1) of the inorganic fine particles A is 10 nm to 60 nm. Van der Waals force with the magnetic carrier particle is increased if the number-average particle diameter of the inorganic fine particles A is within this range. The inorganic fine particles A are less likely to detach as a result, and can maintain the effect of reducing the attachment force with the toner. The number-average particle diameter of the inorganic fine particles A is preferably 20 nm to 60 nm, or more preferably 30 nm to 50 nm.

The number-average particle diameter of the inorganic fine particles A can be controlled by adjusting the manufacturing conditions and the molar ratios of the raw materials.

The true density of the inorganic fine particles A is preferably 4.5 g/mL to 6.0 g/mL, or more preferably 4.5 g/mL to 5.5 g/mL. Within this range, durable stability is further improved because the inorganic fine particles A are less likely to detach from the magnetic carrier particles. The true density of the inorganic fine particles A can be controlled by changing the composition and crystal structure of the inorganic fine particles A.

The dielectric constant of the inorganic fine particles A is preferably 25 pF/m to 100 pF/m, since within this range the balance between charging and discharging is good. It is thought that the rise-up of charging is improved, charge-up is controlled and a suitable charge quantity can be maintained as a result. The dielectric constant is more preferably 30 pF/m to 70 pF/m, or still more preferably 30 pF/m to 50 pF/m.

The dielectric constant of the inorganic fine particles A can be controlled by conditions and operations that reduce the particle crystallinity. An operation that applies mechanical force to disrupt crystal growth is desirable as means of reducing the dielectric constant. For example, crystal growth can be suppressed to achieve a low dielectric constant by applying microbubbling with nitrogen during the crystal growth step.

The content of the inorganic fine particles A in the magnetic carrier is preferably 0.03 mass parts to 0.15 mass parts, or more preferably 0.04 mass parts to 0.13 mass parts per 100 mass parts of the magnetic carrier particle.

Any inorganic fine particles having the above physical properties may be used as the inorganic fine particles A, without any particular limitations.

Specifically, examples of the inorganic compounds which can be used for the inorganic fine particles A include strontium titanate, barium titanate, calcium titanate and magnesium titanate.

From the perspective of image uniformly, preferably the particle contains strontium titanate, and more preferably the particle is strontium titanate.

One example of a method for the inorganic fine particles A manufacturing method using strontium titanate particle is explained below.

As a typical example of a strontium titanate particle, this may be a perovskite-type strontium titanate particle manufactured by a normal pressure heating reaction method involving a reaction performed at normal pressure.

Using a mineral acid peptized product of a hydrolyzed titanium compound as the titanium oxide source, and a water-soluble acidic compound as the strontium source, a particle can be manufactured by reacting a liquid mixture of these while adding an aqueous alkali solution at a temperature of at least 60° C., and then acid treating the mixture. A dry mechanical processing method can be adopted as the method of controlling the shape of the strontium titanate particle.

The normal-pressure heating reaction method is explained here.

A mineral acid peptized product of a hydrolyzed titanium compound can be used as the titanium oxide source. One obtained by a sulfuric acid method and having an $SO_3$ content of not more than 1.0 mass % or preferably not more than 0.5 mass % is preferred. By using metatitanic acid that has been peptized by adjusting the pH to 0.8 to 1.5 with hydrochloric acid, it is possible to obtain a strontium titanate fine particle with a good particle size distribution. Peptization can proceed efficiently if the $SO_3$ content in the metatitanic acid is not more than 1.0 mass %.

Strontium nitrate, strontium chloride or the like may be used as the strontium source. A caustic alkali can be used for the aqueous alkali solution, and a sodium hydroxide aqueous solution is especially desirable.

In the above manufacturing method, factors that affect that particle diameter of the resulting strontium titanate particle include the mixing ratios of the titanium oxide source and strontium source, the concentration of the titanium oxide source at the beginning of the reaction, and the temperature and addition speed when adding the aqueous alkali solution and the like. These can be adjusted appropriately to obtain a strontium titanate particle with the desired particle diameter and particle size distribution. To prevent production of strontium carbonate in the reaction process, it is desirable to prevent carbon dioxide gas contamination by performing the reaction in a nitrogen gas atmosphere or the like.

The mixing ratio of the titanium oxide source to the strontium source during the reaction is preferably a Sr/Ti molar ratio of 0.9 to 1.4, or more preferably 1.05 to 1.20. Because the strontium source is highly soluble in water while the titanium oxide source has low solubility in water, reaction products other than strontium titanate are unlikely to occur and unreacted titanium oxide is unlikely to persist if the Sr/Ti molar ratio is at least 0.9.

The concentration of the titanium oxide source at the start of the reaction is preferably 0.050 mol/L to 1.300 mol/L of $TiO_2$, or more preferably 0.080 mol/L to 1.050 mol/L. The primary particle diameter of the strontium titanate particle can be reduced by keeping the concentration of the titanium oxide source at the start of the reaction within this range.

A higher temperature when adding the aqueous alkali solution yields a product with good crystallinity, but normally a temperature in the range of 60° C. to 100° C. is desirable because a pressure container such as an autoclave becomes necessary above 100° C.

A slower addition rate when adding the aqueous alkali solution yields a strontium titanate particle with a larger particle diameter, while a faster addition rate yields a strontium titanate particle with a smaller particle diameter. The addition rate of the aqueous alkali solution is preferably 0.001 eq/h to 1.2 eq/h of the raw materials, or more preferably 0.002 eq/h to 1.1 eq/h, and may be adjusted appropriately according to the particle diameter desired.

The acid treatment is explained next. If the mixing ratio of the titanium oxide source and strontium source is an Sr/Ti molar ratio of not more than 1.4, unreacted strontium source is unlikely to persist after completion of the reaction, the amount of impurities such as strontium carbonate produced by reaction with $CO_2$ gas in the air is reduced, and a good particle size distribution is obtained. Moreover, controlling the amount of residual impurities such as strontium carbonate on the particle surface also allows the particle to be uniformly coated with an organic surface treatment agent when organic surface treatment is used to confer hydrophobicity. Consequently, acid treatment is desirable to remove unreacted strontium source after adding the aqueous alkali solution.

In acid treatment to removed unreacted strontium source, the pH is preferably adjusted to 2.5 to 7.0, or more preferably to 4.5 to 6.0 with acid. Apart from hydrochloric acid, nitric acid, acetic acid or the like may also be used as the acid in this acid treatment. However, sulfuric acid is undesirable because it produces strontium sulfate, which has low solubility in water.

Shape control is explained next. One method for obtaining a strontium titanate having a rectangular parallelepiped particle shape is to perform dry mechanical treatment for example.

For example, Hybridizer (Nara Machinery Co., Ltd.), NOBILTA (Hosokawa Micron Corp.), Mechanofusion (Hosokawa Micron Corp.), High Flex Gral (Earthtechnica Co., Ltd.) or the like may be used. The surface processability of the strontium titanate can be increased by treating the strontium titanate particle with such equipment.

When the shape of the strontium titanate particle is controlled by mechanical treatment, fine powder of strontium titanate may be produced. Acid treatment is preferably performed to remove this fine powder.

In the acid treatment to remove the fine powder, the pH is preferably adjusted to 0.1 to 5.0 with acid. Apart from hydrochloric acid, nitric acid, acetic acid or the like may also be used for acid treatment. The mechanical treatment to control the shape of the strontium titanate particle is preferably performed before surface treatment of the strontium titanate particle.

Surface treatment of the inorganic fine particles A is explained. In the present invention, the inorganic fine particles A are inorganic particles which are surface treated with a surface treatment agent. That is, the inorganic fine particles A can be silane coupling agent-treated particle.

Examples of agents used as silane coupling agent include, without any particular limitations, methyl trimethoxysilane, ethyl trimethoxysilane, isobutyl trimethoxysilane, n-propyl trimethoxysilane, n-hexyl trimethoxysilane, n-octyl trimethoxysilane, trifluoropropyl trimethoxysilane, 3-isocyanatopropyl trimethoxysilane, trimethoxypentafluorophenyl silane, triethoxypentafluorophenyl silane, 3-acryloxypropyl trimethoxysilane and n-dodecyl trimethoxysilane. Among them, fluorine silane coupling agents such as trifluoropropyl trimethoxysilane, trimethoxypentafluorophenyl silane and triethoxypentafluorophenyl silane, and isobutyl silane coupling agents such as isobutyl trimethoxysilane, are preferable. One of these alone or a combination of two or more kinds may be used.

One method of treatment is a wet method in which the surface treatment agent and the like are dissolved and dispersed in a solvent, particles of the inorganic compound are added, and the solvent is removed under stirring. Other examples include a dry method in which a coupling agent, a fatty acid metal salt and particles of the inorganic compound are mixed directly, and treatment is performed under stirring.

Methods for improving hydrophobicity include methods of combining another silane coupling agent during treatment, and methods of treating after the surface has been coated with a hydrophobizing agent such as silicone oil. Mixing and stirring multiple kind of silane coupling agents in treatment is desirable because it promote binding between the silane coupling agents, and makes it easier to treat the surface layer of the particles of the inorganic compound more as an island.

An alkyl silane coupling agent or the like is preferably used as the additional silane coupling agent. Specific examples include isobutyl trimethoxysilane and n-propyl trimethoxysilane. One of these alone or a combination of two or more may be used. The hydrophobicity of the inorganic fine particles A is preferably from 20 to 90, or more preferably from 50 to 80.

The solubility parameter (SP2) of the surface treatment agent used on the inorganic fine particles A is preferably 7.00 $(J/mol)^{1/2}$ to 9.00 $(J/mol)^{1/2}$, or more preferably 7.00 $(J/mol)^{1/2}$ to 8.00 $(J/mol)^{1/2}$. Within this range, the charging performances of the inorganic fine particles A is improved.

The SP2 can be adjusted by changing the type and amount of the surface treatment agent. When a plurality of types of surface treatment agents are used, the value of SP2 is assumed to be a value obtained by weighted averaging of the SP values of the respective surface treatment agents. For example, the SP2 value when a surface treatment agent A with an SP2 value of $SP2_1$ is included in A mol % based on the number of moles of all the surface treatment agents, and a surface treatment agent B with an SP2 value of $SP2_2$ is included in (100−A) mol % based on the number of moles of all the surface treatment agents is $$SP2=(SP2_1 \times A+SP2_2 \times (100-A))/100.$$

The same calculation is also performed when there are three or more surface treatment agents.

The magnetic carrier particle has a resin coat layer. The magnetic carrier particle preferably comprises a magnetic carrier core particle and a resin coat layer formed on the surface of the magnetic carrier core particle.

The resin coat layer here preferably contains a resin A and a resin B.

Preferably the resin A is
a copolymer of
(a) a (meth)acrylic acid ester monomer having an alicyclic hydrocarbon group and
(b) a macromonomer containing a polymer portion and a reactive portion bound to the polymer portion, wherein the polymer portion has a polymer of at least one kind of monomer selected from the group consisting of methyl acrylate, methyl methacrylate, butyl acrylate, butyl methacrylate, 2-ethylhexyl acrylate and 2-ethylhexyl methacrylate, and
the reactive portion has a reactive C—C double bond, while the resin B is
a copolymer of
(c) a styrene monomer and
(d) a (meth)acrylic acid ester monomer represented by Formula (2) below.

In the molecular weight distribution of the resin coat layer according to gel permeation chromatography (GPC), moreover, a peak derived from the resin B preferably exists in the molecular weight range of 1,000 to 9,500.

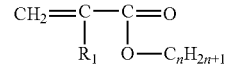
(2)

Where, $R_1$ represents H or $CH_3$, and n is an integer from 2 to 8.

When the macromonomer part is located in the side chains of the molecule of the resin A, a degree of space may be created because the macromoner part is three-dimensionally bulky, preventing the molecules of the resin A from coming close together. A charge relaxation effect derived from the resin B therefore occurs when the resin B, which is a low molecular weight resin, penetrates the resulting spaces. It is also thought that the toughness and wear resistance of the resin coat layer are improved because the resin A is present on the surface of a magnetic carrier particle that has been coated with this resin coat layer.

To increase the life of the magnetic carrier, suppress fogging and reduce density non-uniformity within the image plane, a peak derived from the resin B preferably exists in the molecular weight range of 2,000 to 9,000.

If the peak derived from the resin B is at a molecular weight of at least 1,000, the toughness and wear resistance of the resin coat layer are improved, peeling and scraping of the resin coat layer are suppressed during long-term use, and changes in image density tend to be improved. If the peak derived from the rein B is at a molecular weight of not more than 9,500, the charge relaxation effect from the resin B can be fully realized, and fogging and density non-uniformity within the image plane tend to be improved.

The molecular weight of the peak from the resin B can be adjusted by changing the reaction time when manufacturing the resin B to control the degree of polymerization.

In the molecular weight distribution of the resin coat layer according to gel permeation chromatography (GPC), a peak derived from the resin A preferably exists in the molecular weight range of 25,000 to 70,000, or more preferably in the range of 40,000 to 60,000.

If the peak derived from the resin A is at a molecular weight of at least 25,000, the toughness and wear resistance of the resin coat layer can be maintained, peeling and scraping of the resin coat layer can be suppressed during long-term use, and changes in image density can be suppressed. If the peak from the resin A is at a molecular weight of not more than 70,000, charge relaxation of the resin coat layer is satisfactory, image density non-uniformity is reduced within the image plane, and fogging is suppressed.

The peak molecular weight from the resin A can be adjusted by changing the reaction time when manufacturing the resin A to control the degree of polymerization. The solubility parameter (SP1) of the resin coat layer is preferably 18.00 $(J/mol)^{1/2}$ to 20.00 $(J/mol)^{1/2}$, more preferably 18.50 $(J/mol)^{1/2}$ to 19.60 $(J/mol)^{1/2}$, or still more preferably 18.50 $(J/mol)^{1/2}$ to 19.50 $(J/mol)^{1/2}$. Within this range, the charging performance of the magnetic carrier is improved.

The SP1 can be adjusted by changing the type or amount of the resin used in the resin coat layer. When a plurality of types of the resins are used in the resin coat layer, the value of SP1 is calculated from ratio (based on the number of moles) of each monomer units in the whole resin. <Resin A>

The resin A used in the resin coat layer is a vinyl resin that is a copolymer of a vinyl monomer having a cyclic hydrocarbon group in the molecular structure with another vinyl monomer. In particular, it must be a copolymer of a macromonomer and a (meth)acrylic acid ester monomer having an alicyclic hydrocarbon group.

With a polymer (resin A) of monomers including at least a (meth)acrylic acid ester monomer having an alicyclic hydrocarbon group, the resin layer coated on the surface of the magnetic carrier core particle has a smooth coat surface. This helps to suppress attachment of toner-derived components to the magnetic carrier, and prevent loss of charging performance. The macromonomer serves to improve adhesiveness with the magnetic carrier core particle, and improve image density stability. Moreover, in the present invention it is also possible to reduce charge leakage from thin coat layer parts over the long term in high-humidity environments, stabilize the image density after storage, and suppress fogging.

Examples of the (meth)acrylic acid ester monomer having an alicyclic hydrocarbon group include cyclobutyl acrylate, cyclopentyl acrylate, cyclohexyl acrylate, cycloheptyl acrylate, dicyclopentenyl acrylate, dicyclopentanyl acrylate, cyclobutyl methacrylate, cyclopentyl methacrylate, cyclohexyl methacrylate, cycloheptyl methacrylate, dicyclopentenyl methacrylate and dicyclopentanyl methacrylate. One or two or more of these may be selected and used.

The macromonomer contains a polymer portion and a reactive portion bound to the polymer portion. Examples of the polymer portion include a polymer of at least one monomer selected from the group consisting of methyl acrylate, methyl methacrylate, butyl acrylate, butyl methacrylate, 2-ethylhexyl acrylate, and 2-ethylhexyl methacrylate. The reactive portion has a reactive C—C double bond.

Examples of the reactive portion having reactive C—C double bond include vinyl group, acryloyl group and methacryloyl group.

The macromonomer is a macromonomer obtained by polymerizing at least one kind of monomer selected from the group consisting of methyl acrylate, methyl methacrylate, butyl acrylate, butyl methacrylate, 2-ethylhexyl acrylate and 2-ethylhexyl methacrylate.

The ratio of the (meth)acrylic acid ester monomer having an alicyclic hydrocarbon group is preferably 50.0 mass % to 90.0 mass %, or more preferably 60.0 mass % to 85.0 mass %. If it is at least 50.0 mass %, the toughness and wear resistance of the resin coat layer can be maintained, peeling and scraping of the resin coat layer can be suppressed during long-term use, and changes in image density can be controlled. If it is not more than 90.0 mass %, the resin coat layer acquires sufficient charge relaxation properties, density non-uniformity within the image plane is reduced, and fogging is suppressed.

The ratio of the macromonomer is preferably 10.0 mass % to 50.0 mass %, or more preferably 15.0 mass % to 40.0 mass %. If it is at least 10.0 mass %, the resin coating layer acquires sufficient charge relaxation properties, density non-uniformity within the image plane is reduced, and a loss of line reproducibility is prevented. If it is not more than 50.0 mass %, the toughness and wear resistance of the resin coat layer can be maintained, peeling and scraping of the resin coat layer can be suppressed during long-term use, and changes in image density can be prevented.

For reasons of coating stability, the weight-average molecular weight (Mw) of the resin A is preferably 20,000 to 75,000, or more preferably 25,000 to 70,000.

A copolymer may also be obtained using another (meth)acrylic monomer as a monomer in addition to the (meth)acrylic acid ester having an alicyclic hydrocarbon group.

Examples of this other (meth)acrylic monomer include methyl acrylate, methyl methacrylate, ethyl acrylate, ethyl methacrylate, butyl (here and below, n-butyl, sec-butyl, iso-butyl or tert-butyl) acrylate, butyl methacrylate, 2-ethylhexyl acrylate, 2-ethylhexyl methacrylate, acrylic acid, methacrylic acid and the like. One of these or two or more may be selected and used.

The peak molecular weight of the macromonomer part of the resin A is preferably 1,000 to 9,500. If the peak molecular weight of the macromonomer part of the resin A is at least 1,000, it will be more effectively penetrate the macromonomer part of the resin B, improving the toughness and wear resistance of the resin coat layer and further suppressing changes in image density. If the peak molecular weight of the macromonomer part of the resin A is not more than 9,500, on the other hand, the resin coat layer acquires sufficient charge relaxation properties, density non-uniformity within the image plane is reduced, and fogging is suppressed.

<Resin B>

The resin B used in the resin coat layer is a copolymer of a styrene monomer such as styrene or vinyl toluene with a (meth)acrylic acid ester monomer represented by Formula (2) above.

By including a styrene monomer in the copolymer, it is possible to raise the glass transition temperature above that obtained with a resin containing no styrene monomer even at the same molecular weight, and maintain the toughness of the resin coat layer even at a low molecular weight. By including the (meth)acrylic acid ester monomer represented by Formula (2) above, moreover, it is possible to increase affinity for the macromonomer of the resin A, which has a similar structure, allowing the resin B to more effectively penetrate the macromonomer part, and improving the toughness and wear resistance of the resin coat layer while also reducing density non-uniformity within the image plane and suppressing fogging.

The resin used as the resin B is not particularly limited, and examples include styrene copolymers such as styrene/ethyl acrylate copolymers, styrene/butyl acrylate copolymers, styrene/octyl acrylate copolymers, styrene/ethyl methacrylate copolymers, styrene/butyl methacrylate copolymers, and styrene/octyl methacrylate copolymers. These may be used independently, or multiple kinds may be combined.

The weight-average molecular weight (Mw) of the resin B is preferably 1,000 to 9,500, or more preferably 1,500 to 9,000. If the Mw of the resin B is at least 1,000, the toughness and wear resistance of the resin coat layer are further improved, and changes in image density are suppressed. In the Mw of the resin B is not more than 9,500, image density non-uniformity within the image plane is reduced, and fogging is further suppressed.

The ratio of the (meth)acrylic acid ester monomer represented by the Formula (2) that is used in the resin B is preferably 5 ppm to 6,000 ppm, or more preferably 10 ppm to 5,000 ppm. Within this range, the toughness of the resin coat layer is improved, and affinity of the (meth)acrylic acid ester monomer part for the macromonomer part is further increased, improving the toughness and wear resistance of the resin coat layer while also reducing density non-uniformity within the image plane and suppressing fogging.

The amount of the coating resin is preferably 1.0 mass part to 3.0 mass parts per 100 mass parts of the magnetic carrier core particle. If the coating resin amount is at least 1.0 mass parts, the toughness and wear resistance of the resin are increased, and changes in image density are suppressed. If the coating resin amount is not more than 3.0 mass parts, the charge relaxation properties are increased, image density non-uniformity within the image plane is reduced, and fogging is further suppressed.

The mass-based ratio of the resin A in the coating resin (resin A/(resin A+resin B)×100) is preferably 60 to 100, or more preferably 70 to 100.

The coverage ratio of the magnetic carrier surface by the inorganic fine particles A as measured by X-ray photoelectron spectroscopy (hereunder called ESCA) is 5.0 atom % to 20.0 atom %. If the coverage ratio is within this range, the points of contact between the toner and the magnetic carrier are reduced, reducing the attachment force between the toner and the magnetic carrier. It is thought that this serves to mitigate impacts to the magnetic carrier from additives released from the toner and from toner particles, thereby reducing contamination of the magnetic carrier surface. It is thought that stable charging performance and durability can be maintained as a result during long-term use in high-temperature, high-humidity environments. The coverage ratio is preferably 7.0 atom % to 18.0 atom %, or more preferably 8.0 atom % to 15.0 atom %.

The coverage rate can be controlled by changing the number-average particle diameter of the inorganic fine particles A and the content of the inorganic fine particles A relative to the magnetic carrier particle.

The magnetic carrier core particle is explained next.

A known magnetic carrier core particle may be used as the magnetic carrier core particle in the magnetic carrier, but it is desirable to use either a magnetic body-dispersed resin particle comprising a magnetic body dispersed in a resin component, or a porous magnetic core particle containing resin in the pores. With these, the load on the toner can be reduced because the true density of the magnetic carrier is reduced. There is thus less image quality deterioration even during long-term use, and it is possible to reduce the exchange frequency of a two-component developer composed of a toner and the magnetic carrier. However, the effects of the invention can also be sufficiently obtained with a commercial magnetic carrier core particle that is not a magnetic body-dispersed resin particle or porous magnetic core particle.

Various kinds of magnetic iron compound particle powder may be used as the magnetic component in the magnetic body-dispersed resin particle, such as magnetite particle powder and maghemite particle powder, or magnetic iron oxide particle powder comprising these together with one or two or more selected from the silicon oxides, silicon hydroxides, aluminum oxides and aluminum hydroxides, magnetoplumbite-type ferrite particle powers containing barium, strontium or barium-strontium, and spinel-type ferrite particle powder containing one or two or more selected from manganese, nickel, zinc, lithium and magnesium. Of these, magnetic iron oxide particle powder can be used by preference.

In addition to this magnetic component, non-magnetic inorganic compound particle powder, including non-magnetic iron oxide particle powder such as a hematite particle powder; non-magnetic hydrous ferric oxide particle powder such as goethite particle powder or other non-magnetic inorganic compound particle powder such as titanium oxide particle powder, silica particle powder, talc particle powder, alumina particle powder, barium sulfate particle powder, barium carbonate particle powder, cadmium yellow particle powder, calcium carbonate particle powder or zinc oxide particle powder, may be used in combination with the magnetic iron compound particle powder.

When mixing a non-magnetic inorganic compound particle powder with a magnetic iron compound particle powder, the mixing ratio of the magnetic iron compound particle powder is preferably at least 30 mass %.

All or part of the magnetic iron compound particle powder is preferably treated with a lipophilic treatment agent.

An organic compound having one or two or more functional groups selected from an epoxy group, amino group, mercapto group, organic acid group, ester group, ketone group, alkyl halide group and aldehyde group, or a mixture of such compounds, may be used as the lipophilic treatment agent in this case.

A coupling agent is preferred as an organic compound having a functional group, a silane coupling agent, titanium coupling agent or aluminum coupling agent is more preferred, and a silane coupling agent is especially preferred.

A thermosetting resin is preferred as the binder resin constituting the magnetic body-dispersed resin particle.

Examples of thermosetting resins include phenol resins, epoxy resins, unsaturated polyester resins and the like, but from the standpoint of cost and ease of manufacturing, it is desirable to include a phenol resin. One example is a phenol formaldehyde resin.

The content ratios of the binder resin and magnetic iron compound particle powder constituting the magnetic body-dispersed resin particle are preferably 1 mass % to 20 mass % of the binder resin and 80 mass % to 99 mass % of the magnetic iron compound particle powder.

The method for manufacturing the magnetic body-dispersed resin particle is explained next.

As described in the examples below for example, the magnetic body-dispersed resin particle is produced by stirring a phenol and an aldehyde in an aqueous medium in the presence of a magnetic inorganic compound particle powder and a basic catalyst. The phenol and aldehyde are then reacted and cured to produce a composite particle containing a magnetic iron oxide particle powder or other inorganic compound powder and a phenol resin.

It may also be manufactured by a kneading pulverization method in which a binder resin containing an inorganic compound particle such as a magnetic iron oxide particle powder is pulverized.

The former method is preferred for ease of controlling the particle diameter of the magnetic carrier and obtaining a sharp particle size distribution.

The porous magnetic core particle is explained next.

Magnetite or ferrite is preferred as the material of the porous magnetic core particle. Ferrite is especially preferred as the material of the porous magnetic core particle because it allows the porous structure of the porous magnetic core particle to be controlled, and the resistance to be adjusted.

The ferrite is a sintered body represented by the following general formula:

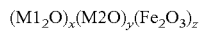

$(M1_2O)_x(M2O)_y(Fe_2O_3)_z$ where, M1 is a univalent and M2 is a bivalent metal, and when x+y+z=1.0, x and y are such that 0<(x, y)<0.8, and z is such that 0.2<z<1.0.

Where, one or more metal atoms selected from the group consisting of Li, Fe, Mn, Mg, Sr, Cu, Zn and Ca are preferably used as M1 and M2. In addition, Ni, Co, Ba, Y, V, Bi, In, Ta, Zr, B, Mo, Na, Sn, Ti, Cr, Al, Si or a rare earth or the like may be used.

The magnetic carrier needs to maintain a suitable degree of magnetization and a pore diameter within the desired range, and the porous magnetic core particle also needs to have a suitable degree of surface roughness. The speed of the ferritic reaction also needs to be easily controlled, and the specific resistance and magnetic force of the porous magnetic core need to be controlled appropriately. For all these reasons, an Mn ferrite, Mn-Mg ferrite, Mn—Mg—Sr ferrite or Li-Mn ferrite containing Mn element is more preferred.

One example of a manufacturing process using a porous magnetic core particle as the magnetic carrier core particle is explained in detail below.

<Step 1: Weighing and Mixing Step>

The raw materials of the above ferrite are weighed and mixed.

Examples of ferrite raw materials include metal particles of the aforementioned metal elements, as well as oxides, hydroxides, oxalate salts, carbonate salts and the like of these.

Examples of the mixing apparatus include ball mills, planetary mills, Jet mills and vibration mills. A ball mill is especially desirable from the standpoint of the mixing properties.

Specifically, the weighed ferrite raw materials and balls are placed in the ball mill, and pulverized and mixed for 0.1 hour to 20.0 hours.

<Step 2: Pre-Firing Step>

The pulverized and mixed ferrite raw materials are pre-fired for 0.5 hour to 5.0 hours at a firing temperature of 700° C. to 1200° C. in an air atmosphere or a nitrogen atmosphere to obtain a ferrite. A burner-type furnace, rotary kiln or electric furnace or the like may be used for firing.

<Step 3: Pulverization Step>

The pre-fired ferrite prepared in the Step 2 is then pulverized in a pulverizer.

The pulverizer is not particularly limited as long as it can yield the desired particle diameter, and may be a crusher, hammer mill, ball mill, bead mill, planetary mill, Jet mill or the like for example.

To give the pulverized ferrite the desired particle diameter, it is desirable to control the material, particle size, and operating time of the balls or beads used in a ball mill or bead mill for example. Specifically, the particle diameter of the pre-fired ferrite slurry can be reduced by using beads with a higher true density, or increasing the pulverization time. Moreover, the pre-baked ferrite can be given a broader particle size distribution by using balls or beads with a higher true density, and shortening the pulverization time. A pre-fired ferrite with a broader particle size distribution can also be obtained by mixing multiple pre-fired ferrites with different particle diameters.

A greater pulverization efficiency with less scattering of the pulverized product in the mill is obtained with a wet ball mill or bead mill rather than a dry one. Therefore, a wet mill is preferred to a dry mill.

<Step 4: Granulation Step>

Water and a binder are added to the pulverized pre-fired ferrite together with a pore modifier as necessary. Examples of pore modifiers include blowing agents and resin fine particles.

Examples of blowing agents include sodium hydrogencarbonate, potassium hydrogencarbonate, lithium hydrogencarbonate, ammonium hydrogencarbonate, sodium carbonate, potassium carbonate, lithium carbonate and ammonium carbonate.

Examples of resin fine particles include fine particles of polyester, polystyrene, and styrene copolymers such as styrene-vinyltoluene copolymer, styrene-vinylnaphthalene copolymer, styrene-acrylic acid ester copolymers, styrene-methacrylic acid ester copolymers, styrene-α-methyl chloromethacrylate copolymer, styrene-acrylonitrile copolymer, styrene- methyl vinyl ketone copolymer, styrene-butadiene copolymer, styrene-isoprene copolymer and styrene-acrylonitrile-indene copolymer; polyvinyl chloride, phenol resins, modified phenol resins, maleic resins, acrylic resins, methacrylic resins, polyvinyl acetate and silicone resins; polyester resins having monomers selected from the aliphatic polyhydric alcohols, aliphatic dicarboxylic acids, aromatic dicarboxylic acids, aromatic dialcohols and diphenols as structural units; and polyurethane resins, polyamide resins, polyvinylbutyral, terpene resins, coumarone-indene resins, petroleum resins, and hybrid resins having polyester units and vinyl polymer units.

Polyvinyl alcohol for example may be used as the binder.

When wet pulverization has been performed in Step 3, considering the water contained in the ferrite slurry, it is desirable to add a binder and a pore modifier as necessary.

A dispersant may also be added as necessary to the ferrite slurry. The dispersant is not particularly limited, and ammonium polycarbonate may be used for example.

The resulting ferrite slurry is dried and granulated in a heated atmosphere at 100° C. to 200° C. with a spray drying apparatus. The spray drying apparatus is not particularly limited as long as it can yield a porous magnetic core particle of the desired particle diameter, and a spray dryer can be used for example.

The resulting granulated product can be first subjected to particle size adjustment, and then heated for 0.5 hour to 5.0 hours at a firing temperature range of 700° C. to 1200° C. in a rotary furnace or the like to remove organic matter such as the dispersant and binder.

<Step 5: Main Firing Step>

Next, the granulated product is fired for 1 hour to 24 hours at 800° C. to 1400° C.

Firing of the porous magnetic core particle can be promoted by raising the firing temperature and lengthening the firing time to thereby decrease the pore size and reduce the number of pores.

<Step 6: Selection Step>

After the fired particle has been crushed as described above, it can be sorted or sieved to remove coarse particles or fine particles as necessary.

To control adhesion of the magnetic carrier on the image and roughness, the volume-based 50% particle diameter (D50) of the magnetic core particle is preferably 18.0 μm to 68.0 μm.

<Step 7: Filling Step>

Because the physical strength of the porous magnetic core particle may be reduced by the internal pore volume, it is desirable to fill at least some of the pores in the porous magnetic core particle with resin in order to increase the physical strength of the magnetic carrier. The amount of the resin filling the porous magnetic core particle is preferably 2 mass % to 15 mass % of the porous magnetic core particle. As long as there is little variation in the resin content between magnetic carrier particles, only some of the internal vacancies may be filled with resin, or only those vacancies near the surface of the porous magnetic core particle may be filled with resin, leaving the inner vacancies open, or all of the internal vacancies may be filled with resin.

The method of filling the vacancies in the porous magnetic core particles with resin is not particularly limited, and examples include immersion methods, spray methods, brush coating methods, and methods of immersing the porous magnetic core particle in a resin solution by a coating method such as a fluidized bed method, and then volatilizing the solvent. A method of diluting the resin with a solvent and then adding this to the vacancies in the porous magnetic core particle can also be used as the method of filling the vacancies in the porous magnetic core particle with the resin.

The solvent used here may be any capable of dissolving the resin, and in the case of a resin that is soluble in organic solvents, the organic solvent may be toluene, xylene, butyl cellosolve acetate, ethyl methyl ketone, isobutyl methyl ketone or methanol. Water may be used as a solvent in the case of a water-soluble resin or an emulsion-type resin.

The amount of the resin solids in the resin solution is preferably 1 mass % to 50 mass %, or more preferably 1 mass % to 30 mass %. If the amount of the resin solids is not more than 50 mass %, it is easy for the resin solution to uniformly permeate the vacancies in the porous magnetic core particle because the resin solution has low viscosity. If it is at least 1 mass %, the amount of resin is greater, and the attachment force between the resin and the porous magnetic core particle is increased.

The resin filling the vacancies in the porous magnetic core particle may be either a thermoplastic resin or a thermosetting resin. It preferably has high affinity for the porous magnetic core particle, since a resin with high affinity can cover the surface of the porous magnetic core particle while simultaneously filling the vacancies in the porous magnetic core particle.

When the filling resin is a thermoplastic resin, examples include Novolac resins, saturated alkyl polyester resins, polyallylates, polyamide resins and acrylic resins.

Examples of the thermosetting resins include phenol resins, epoxy resins, unsaturated polyester resins and silicone resins.

The magnetic carrier particle is one having a resin coat layer formed by coating the surface of the magnetic carrier core particle with a resin.

The method for coating the resin on the surface of the magnetic carrier core particle is not particularly limited, but examples include immersion methods, spray methods, brush coating methods, dry methods, and methods of coating by an application method such as a fluidized bed.

An electrically conductive particle or a particle or material having charge control properties may also be included in the resin coat layer.

Examples of electrically conductive particles include carbon black, magnetite, graphite, zinc oxide, tin oxide and the like.

The added amount of the electrically conductive particle is preferably 0.1 mass part to 10.0 mass parts per 100 mass parts of the coating resin for purposes of adjusting the resistance of the magnetic carrier.

Examples of particles having charge control properties include particles of organic metal complexes, particles of organic metal salts, chelate compound particles, particles of monoazo metal complexes, particles of acetylacetone metal complexes, particles of hydroxycarboxylic acid metal complexes, particles of polycarboxylic acid metal complexes, particles of polyol metal complexes, polymethyl methacrylate resin particles, polystyrene resin particles, melamine resin particles, phenol resin particles, nylon resin particles, silica particles, titanium oxide particles, alumina particles and the like.

The added amount of the particle having charge control properties is preferably 0.5 mass part to 50.0 mass parts per 100 mass parts of the coating resin for purposes of adjusting the triboelectric charge quantity.

Preferred configurations of the toner are explained in detail below.

The toner preferably contains a binder resin, a colorant and a release agent. The binder resin may be a vinyl resin, polyester resin, epoxy resin or the like. Of these, a vinyl resin or polyester resin is more desirable from the standpoint of charging performance and fixability, and a polyester resin is especially desirable.

A homopolymer or copolymer of a vinyl monomer, or a polyester, a polyurethane, an epoxy resin, polyvinyl butyral, rosin, a modified rosin, a terpene resin, a phenol resin, an aliphatic or alicyclic hydrocarbon resin, an aromatic hydrocarbon resin or the like may also be mixed and used with the aforementioned binder resin as necessary.

As a preferred embodiment, when two or more kinds of resins are mixed and used as the binder resin it is desirable to mix resins with different molecular weights in suitable proportions.

The glass transition temperature (Tg) of the binder resin is preferably 45° C. to 80° C., or more preferably 55° C. to 70° C. The number-average molecular weight (Mn) is preferably 2,500 to 50,000, while the weight-average molecular weight (Mw) is preferably 10,000 to 1,000,000.

The following polyester resin is preferred as a binder resin.

An alcohol component preferably constitutes 45 mol % to 55 mol % and an acid component preferably constitutes 45 mol % to 55 mol % of the total monomer units constituting the polyester resin.

The acid value of the polyester resin is preferably not more than 90 mgKOH/g, or more preferably not more than 50 mgKOH/g, and the hydroxyl value is preferably not more than 50 mgKOH/g, or more preferably not more than 30 mgKOH/g. This is because the charging characteristics of the toner become more environmentally dependent as the number of terminal groups on the molecular chain increases.

The glass transition temperature (Tg) of the polyester resin is preferably 50° C. to 75° C., or more preferably 55° C. to 65° C. The number-average molecular weight is preferably 1,500 to 50,000, or more preferably 2,000 to 20,000. The weight-average molecular weight (Mw) is preferably 6,000 to 100,000, or more preferably 10,000 to 90,000.

A crystalline polyester resin such as the following may also be added to the toner with the aim of promoting toner plasticity and improving low-temperature fixability.

Examples of crystalline polyesters include polycondensates of monomer compositions containing $C_{2-22}$ aliphatic diols and $C_{2-22}$ aliphatic dicarboxylic acids as principal components. A principal component here is to be understood as one with a content of at least 50 mass %.

The $C_{2-22}$ (more preferably $C_{6-12}$) aliphatic diols are not particularly limited, but aliphatic chain (more preferably straight-chain) diols are preferred. Of these, straight-chain aliphatic α,ω-diols such as ethylene glycol, diethylene glycol, 1,4-butanediol and 1,6-hexanediol are desirable examples.

Preferably at least 50 mass %, or more preferably at least 70 mass % of the alcohol component is an alcohol selected from the $C_{2-22}$ aliphatic diols.

A polyhydric alcohol monomer other than an aliphatic diol may also be used. Of the polyhydric alcohol monomers, examples of dihydric monomers include aromatic alcohols such as polyoxyethylenated bisphenol A and polyoxypropylenated bisphenol A; and 1,4-cyclohexane dimethanol and the like.

Examples of trihydric and higher polyvalent alcohol monomers include aromatic alcohols such as 1,3,5-trihydroxymethylbenzene; and aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane and the like.

A monohydric alcohol may also be used as long as it does not detract from the characteristics of the crystalline polyester.

The $C_{2-22}$ (more preferably $C_{6-12}$) aliphatic dicarboxylic acids are not particularly limited, but aliphatic chain (more preferably straight-chain) aliphatic dicarboxylic acids are preferred. These include acid anhydrides and hydrolyzed lower alky esters.

Preferably at least 50 mass %, or more preferably at least 70 mass % of the carboxylic acid component is a carboxylic acid selected from the $C_{2-22}$ aliphatic dicarboxylic acids.

A polyvalent carboxylic acid other that a $C_{2-22}$ aliphatic dicarboxylic acid may also be used. Of the other polyvalent carboxylic acid monomers, examples of divalent carboxylic acids include aromatic carboxylic acids such as isophthalic acid and terephthalic acid; aliphatic carboxylic acids such as n-dodecylsuccinic acid and n-dodecenylsuccinic acid; and alicyclic carboxylic acids such as cyclohexanedicarboxylic acid, as well as acid anhydrides and lower alkyl esters of these and the like.

Examples of trivalent and further higher polyvalent carboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid and pyromellitic acid, and aliphatic carboxylic acids such as 1,2,4-butanetricarboxylic acid, 1,2,5-hexanetricarboxylic acid and 1,3-dicarboxyl-2-methyl-2-methylenecarboxypropane, as well as derivatives of these such as acid anhydrides and lower alkyl esters.

A monovalent carboxylic acid may also be included as long as it does not detract from the characteristics of the crystalline polyester.

The crystalline polyester may be manufactured by ordinary polyester synthesis methods. For example, following an esterification reaction or ester exchange reaction between the carboxylic acid monomer and alcohol monomer, a polycondensation reaction can be performed by normal methods under reduced pressure or with introduced nitrogen gas to obtain the desired crystalline polyester.

The amount of the crystalline polyester used is preferably 0.1 mass part to 30 mass parts, or more preferably 0.5 mass part to 20 mass parts, or still more preferably 3 mass part to 15 mass parts per 100 mass parts of the binder resin.

The following are examples of non-magnetic colorants.

Examples of black colorants include carbon black, and black colorants prepared using yellow colorants, magenta colorants and cyan colorants.

Examples of coloring pigments for magenta toners include condensed azo compounds, diketopyrrolopyrrole compounds, anthraquinones, quinacridone compounds, basic dye lake compounds, naphthol compounds, benzimidazolone compounds, thioindigo compounds and perylene compounds. Specific examples include C.I. pigment red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 144, 146, 150, 163, 166, 169, 177, 184, 185, 202, 206, 207, 209, 220, 221, 238, 254 and 269; and C.I. pigment violet 19, C.I. vat red 1, 2, 10, 13, 15, 23, 29 and 35 and the like.

A pigment may be used alone as a colorant, but a dye and a pigment may also be combined to improve sharpness.

Examples of dyes for magenta toners include oil-soluble dyes such as C.I. solvent red 1, 3, 8, 23, 24, 25, 27, 30, 49, 81, 82, 83, 84, 100, 109 and 121, C.I. disperse red 9, C.I. solvent violet 8, 13, 14, 21 and 27 and C.I. disperse violet 1, and basic dyes such as C.I. basic red 1, 2, 9, 12, 13, 14, 15, 17, 18, 22, 23, 24, 27, 29, 32, 34, 35, 36, 37, 38, 39 and 40 and C.I. basic violet 1, 3, 7, 10, 14, 15, 21, 25, 26, 27 and 28.

Examples of coloring pigments for cyan toners include C.I. pigment blue 1, 2, 3, 7, 15:2, 15:3, 15:4, 16, 17, 60, 62, and 66; and C.I. vat blue 6, C.I. acid blue 45, and copper phthalocyanine pigments comprising phthalocyanine frameworks substituted with 1 to 5 phthalimidomethyl groups.

Examples of yellow coloring pigments include condensed azo compounds, isoindolinone compounds, anthraquinone compounds, azo metal compounds, methine compounds and allylamide compounds. Specific examples include C.I. pigment yellow 1, 2, 3, 4, 5, 6, 7, 10, 11, 12, 13, 14, 15, 16, 17, 23, 62, 65, 73, 74, 83, 93, 95, 97, 109, 110, 111, 120, 127, 128, 129, 147, 155, 168, 174, 180, 181, 185 and 191; and C.I. vat yellow 1, 3, 20 and the like. Dyes such as C.I. direct green 6, C.I. basic green 4, C. I. basic green 6 and solvent yellow 162 may also be used.

The amount of the colorant used is preferably 0.1 mass part to 30 mass parts or more preferably 0.5 mass part to 20 mass parts or still more preferably 3 mass parts to 15 mass parts per 100 mass parts of the binder resin.

A colorant may also be mixed ahead of time with the binder resin to make a master batch for the toner. The colorant can then be dispersed properly in the toner by melt kneading this colorant master batch with the other raw materials (binder resin, wax, etc.).

A charge control agent may also be used in the toner as necessary to further stabilize the charging performance. The charge control agent is preferably used in the amount of 0.5 mass part to 10 mass parts per 100 mass parts of the binder resin. If the amount is at least 0.5 mass part, the charging characteristics are further improved. If it is not more than 10 mass parts, compatibility with the other materials is good, and it is possible to obtain a more appropriate charge quantity under low humidity conditions.

Examples of charge control agents include the following.

Organic metal complexes or chelate compounds for example are effective as negative charge control agents for controlling the negative charge of the toner. Examples include monoazo metal complexes, metal complexes of aromatic hydroxycarboxylic acids, and metal complexes of aromatic dicarboxylic acids. Other examples include aromatic hydroxycarboxylic acids, aromatic mono- and polycarboxylic acids and their metal salts, anhydrides or esters, or phenolic derivatives of bisphenols.

Examples of positive charge control agents for controlling the positive charge of the toner include quaternary ammonium salts such as nigrosine and its modified products such as fatty acid metal salts and the like, tributylbenzylammonium-1-hydroxy-4-naphthosulfonate and tetrabutylammonium tetrafluoroborate, onium salts such as phosphonium salts that are analogs of these, and chelate pigments thereof; triphenylmethane dyes and lake pigments of these (using phosphotungstic acid, phosphomolybdic acid, phosphotungstenmolybdic acid, tannic acid, lauric acid, gallic acid, ferricyanic acid or a ferrocyan compound or the like as the laking agent), and metal salts of higher fatty acids, including diorgano tin oxides and such as dibutyl tin oxide, dioctyl tin oxide and dicyclohexyl tin oxide and diorgano tin borates such as dibutyl tin borate, dioctyl tin borate and dicyclohexyl tin borate.

One or two or more kinds of release agent(s) may also be included in the toner particle as necessary. Examples of release agents include the following.

An aliphatic hydrocarbon wax such as low-molecular-weight polyethylene, low-molecular-weight polypropylene, microcrystalline wax or paraffin wax may be used by preference. Other examples include oxides of aliphatic hydrocarbon waxes, such as polyethylene oxide wax, and block copolymers of these; waxes consisting primarily of fatty acid esters, such as carnauba wax, sasol wax and montanic acid ester wax; and partially or fully deoxidized fatty acid esters, such as deoxidized carnauba wax.

The amount of the release agent is preferably 0.1 mass part to 20 mass parts, or more preferably 0.5 mass part to 10 mass parts per 100 mass parts of the binder resin.

The melting point as defined by the maximum endothermic peak temperature during temperature rise when the release agent is measured by differential scanning calorimetry (DSC) is preferably 65° C. to 130° C., or more preferably 80° C. to 125° C. If the melting point is at least 65° C., the toner viscosity is within a suitable range, and toner adhesion to the photosensitive member is less likely. If the melting point is not more than 130° C., low-temperature fixability is improved.

A fine powder that improves the flowability of the toner when added to the toner particle may be used as a flowability improver.

Examples of flowability improvers include fluorine resin powders such as vinylidene fluoride fine powder and polytetrafluoroethylene fine powder, fine powdered silica such as wet silica or dry silica, and titanium oxide fine powder, strontium oxide fine powder or alumina fine powder that has been surface treated with a silane coupling agent, titanium coupling agent or silicone oil, and one that has been treated until the degree of hydrophobicity as measured by a methanol titration test is in the range of 20 to 90 is especially desirable.

The flowability improver is used in the amount of preferably 0.1 mass part to 10 mass parts, or more preferably 0.2 mass part to 8 mass parts per 100 mass parts of the toner.

When mixing the magnetic carrier of the invention with a toner for use as a two-component developer, good effects can ordinarily be obtained if the mixing ratio of the magnetic carrier is such that the toner concentration in the developer is preferably 2 mass % to 15 mass %, or more preferably 4 mass % to 13 mass %. If the toner concentration is at least 2 mass %, a loss of image density is suppressed, while if it is not more than 15 mass %, fogging and scattering within the device are less likely.

In the case of replenishing developer that is supplied to the developing device when the toner concentration of the two-component developer falls within the device, the amount of toner per 1 mass part of the replenishing magnetic carrier is 2 mass parts to 50 mass parts.

<Image Forming Method>

In FIG. 1, an electrostatic latent image bearing member 1 rotates in the direction of the arrow in the figure. The electrostatic latent image bearing member 1 is charged by a charging device 2 (serving as charging means), and the surface of the charged electrostatic latent image bearing member 1 is then exposed to light by an exposure unit 3 (serving as electrostatic latent image forming means) to form an electrostatic latent image. Developing device 4 has a developer container 5 containing a two-component developer, and developer carrying member 6 disposed in a rotatable state with magnets 7 as magnetic field generating means enclosed in the developer carrying member 6. At least one of the magnets 7 is disposed facing the latent image bearing member. The two-component developer is held on the developer carrying member 6 by the magnetic field of the magnets 7, and a regulating member 8 regulates the amount of the two-component developer, which is transported to the developing area facing the electrostatic latent image bearing member 1. In the developing area, a magnetic brush is formed by the magnetic field generated by the magnets 7. The electrostatic image is subsequently made visible as a toner image by application of developing bias obtained by superimposing an alternating electric field on a DC electric field. The toner image formed on the electrostatic latent image bearing member 1 is transferred electrostatically to a recording medium 12 by a transfer charging device 11.

Figure 2:
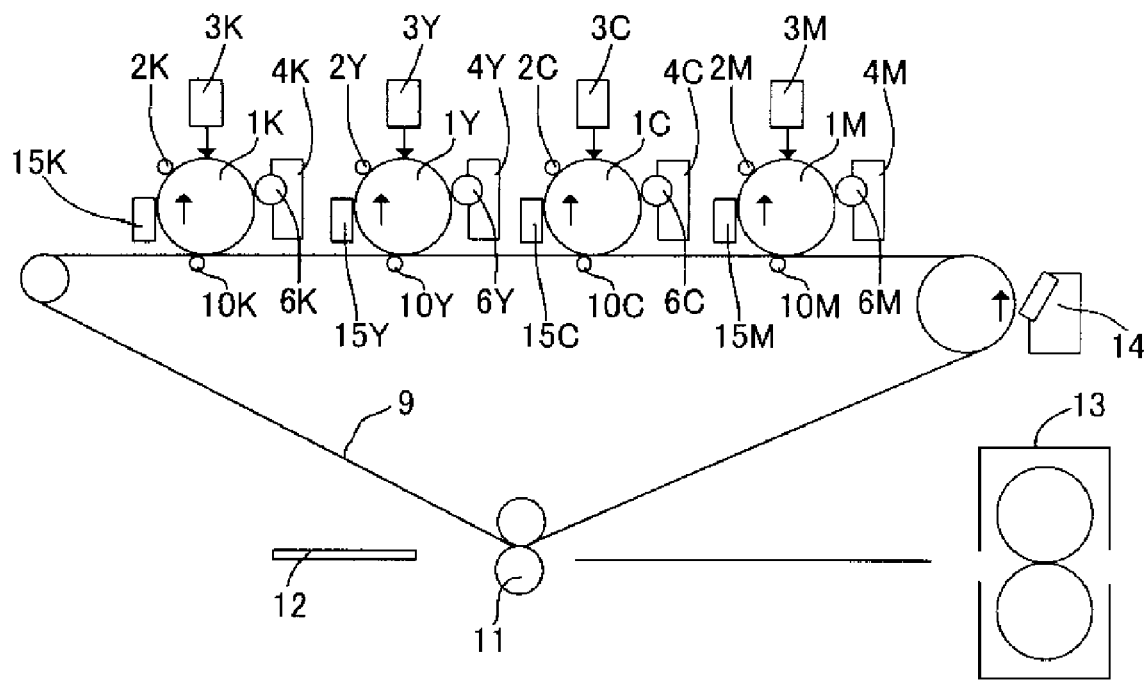
FIG. 2 is a schematic view of an image-forming device using the invention.

As shown in FIG. 2, the image may also be transferred temporarily from the electrostatic latent image bear member 1 to an intermediate transfer member 9 before being transferred electrostatically to the transfer material (recording medium) 12. The recording medium 12 is then transported to a fixing unit 13, where it is subjected to heat and pressure to fix the toner on the recording medium 12. The recording medium 12 is then discharged outside the unit as an output image. Toner remaining on the electrostatic latent image bearing member 1 after the transfer step is removed by the cleaner 15. After being cleaned by the cleaner 15, the electrostatic latent image bearing member 1 is electrically initialized by light irradiation from a pre-exposure 16, and the above image-forming operation is repeated.

FIG. 2 shows one example of a schematic view of an image-forming method applied to a full-color image-forming apparatus.

In the figure, the arrangement of the image-forming units K, Y, C, M and the like and the arrows showing the direction of rotation are not particularly limited. K here means black, Y yellow, C cyan and M magenta. In FIG. 2, electrostatic latent image bear members 1K, 1Y, 1C and 1M rotate in the direction of the arrows. Each electrostatic latent image bearing member is charged by charging devices 2K, 2Y, 2C and 2M (serving as charging means), and the surface of each charged electrostatic latent image bearing member is then exposed by exposure units 3K, 3Y, 3C, and 3M (serving as electrostatic latent image-forming means) to form an electrostatic latent image. These electrostatic latent images are subsequently made visible as toner images using the two-component developers carried on the developer carrying members 6K, 6Y, 6C, and 6M of the developing devices 4K, 4Y, 4C and 4M (serving as developing means). These are then transferred to an intermediate transfer member 9 by intermediate transfer charging devices 10K, 10Y, 10C and 10M (serving as transfer means). These are then transferred to the recording medium 12 by the transfer charging device 11 (serving as transfer means), and the recording medium 12 is then fixed by application of heat and pressure from the fixing unit 13 (serving as fixing means) and output as an image. The intermediate transfer member cleaner 14, which is the cleaning member for the intermediate transfer member 9, then collects the residual toner and the like left over from transfer.

As a specific developing method, preferably AC voltage is applied to the developer carrying member to form an alternating electric field in the developing zone as developing is performed with the magnetic brush in contact with the photosensitive member. The distance between the developer carrying member (developing sleeve) 6 and the photosensitive drum (S-D distance) is preferably 100 μm to 1,000 μm in order to prevent carrier adhesion and improve dot reproducibility. If it is at least 100 μm, the developer is easier to supply, and a loss of image density can be prevented. If it is not more than 1,000 μm, the magnetic field lines from magnetic pole S1 narrow and magnetic brush density increases, resulting in excellent dot reproducibility and making carrier adhesion less likely due to the increased force constraining the magnetic carrier.

The voltage between peaks of the alternating electric field (Vpp) is preferably 300 V to 3,000 V, or more preferably 500 V to 1,800 V. The frequency is preferably 500 Hz to 10,000 Hz, or more preferably 1,000 Hz to 7,000 Hz, and may be selected appropriately for each process. In this case, the AC bias waveform for creating the alternative electric field may be a triangular, rectangular or sine wave form, or a waveform with a variable duty ratio.

To respond to changes in the speed of formation of the toner image, development is preferably performed by applying developing bias voltage having non-continuous AC bias voltage (intermittent alternating superimposed voltage) to the developer carrying member. If the applied voltage is at least 300 V, it is easier to obtain an adequate image density, and easier to collect fogging toner from non-image parts. If it is not more than 3,000 V, the latent image is less likely to be disturbed via the magnetic brush, and image quality is less likely to deteriorate.

By using a two-component developer with a properly charged toner it is possible to reduce fog removal voltage (Vback) and lower the primary charge of the photosensitive member, thereby extending the life of the photosensitive member. Depending on the developing system, the Vback is preferably not more than 200 V, or more preferably not more than 150 V. To obtain an adequate image density, a contrast potential of preferably 100 V to 400 V is preferably used.

The configuration of the electrostatic latent image photosensitive member may normally be the same as that of the photosensitive member used in the image-forming device. For example, the photosensitive member may have a configuration comprising a conductive layer, sub-layer, charge generation layer and charge transport layer and a charge injection layer as necessary in that order on a conductive substrate made of aluminum, SUS or the like.

The conductive layer, sub-layer, charge generation layer and charge transport layer may be those normally used in photosensitive members. A charge injection layer or protective layer for example may be used as the outermost layer of the photosensitive member.

The methods for measuring the various physical properties in the present invention are explained next.

<Calculating SP Values>

The SP values are solubility parameters, and affinity is greater the closer the values. If the SP value (SP1) of the resin coat layer $(J/mol)^{1/2}$ and the SP value (SP2) $(J/mol)^{1/2}$ of the surface treatment agent used in the inorganic fine particles A are in the relationship:

$$SP1-SP2 \leq 14.00 \quad (1)$$

then it is difficult for the inorganic fine particles A to detach from the surface of the magnetic carrier particle. Excellent charging performance can be obtained as a result. SP1−SP2 is preferably not more than 13.00, or more preferably not more than 12.00. There is no particular lower limit, but preferably it is at least −14.00, or more preferably at least −12.00.

The SP value can be determined by Fedors' equation. For the values of Δei and Δvi, the energies of vaporization and molar volumes (25° C.) of the atoms and atomic groups by Fedors according to Table 3-9 of "Basic Coating Science", pages 54-57, 1986 (published by Maki Shoten) may be consulted.

Equation: $\delta i=[Ev/V]^{(1/2)}=[\Delta ei/\Delta vi]^{(1/2)}$

Ev: Evaporation energy

V: Molar volume

Δei: Evaporation energy of atoms or atomic groups of i component

Δvi: Molar volume of atoms or atomic groups of i component

<Method for Measuring SP Values from Magnetic Carrier>

The method used to isolate the resin coat layer from the magnetic carrier is a method of taking 1.0 g of the magnetic carrier in a cup, and eluting the coating resin with 10.0 g of toluene.

The eluted coating resin is allowed to dry to obtain a resin sample. The resulting resin sample is heated to 595° C. with a JPS-700 thermal decomposition unit (Japan Analytical Industry Co., Ltd.) in the presence of tetramethyl ammonium hydroxide (TMAH), and thermally decomposed while being methylated. A GC-MASS (Thermo Fisher Scientific K. K., ISQ Focus GC, HP-5MS [30m]) is then used to obtain peaks for the alcohol component and carboxylic acid component derived from the ester compound. Thermal decomposition of polyester and polystyrene normally yields methylated products. The resulting peaks are analyzed, and the structure of the coating resin is estimated and identified.

The SP value of the coating resin is calculated by the methods described under "Calculating SP values" from the structure of the coating resin, and given as the SP value of the magnetic carrier.

<Calculating Number-Average Particle Diameter of Inorganic Fine Particles A>

The number-average particle diameter of the inorganic fine particles A is calculated from an image of the magnetic carrier surface taken with a Hitachi S-4800 ultra-high resolution field emission scanning electron microscope (Hitachi High Technologies Corp.). The S-4800 imaging conditions are as follows.

(1) Sample Preparation

Conductive paste is thinly applied to a sample stand (15 mm×6 mm aluminum sample stand), and the magnetic carrier is then blown onto this. This is then air blown to remove excess magnetic carrier from the sample stand and thoroughly dry the sample. The sample stand is set in a sample holder, and the sample stand height is adjusted to 36 mm with a sample height gauge.

(2) Setting S-4800 Observation Conditions

The number-average particle diameter is calculated using an image obtained by backscattered electron imaging with the S-4800. Liquid nitrogen is injected to overflowing into an anticontamination trap attached to the case of the S-4800, and left for 30 minutes. "PC-SEM" is started on the S-4800 to perform flushing (purification of FE chip electron source). The acceleration voltage display part of the control panel on the image is clicked, and the "flushing" button is pressed to open a flushing performance dialog. Flushing is performed after confirming that the flushing strength is 2. It is confirmed that the emission current due to flushing is 20 μA to 40 μA. The sample holder is inserted into the sample chamber of the S-4800 case. "Starting point" is pressed on the control panel to move the sample holder to the observation position.

The acceleration voltage display part is clicked to open an HV settings dialog, and the acceleration voltage is set to "1.1 kV" and the emission current to "20 μA". Signal selection is set to "SE" in the "Basic" tab of the operation panel, "Upper (U)" and "+BSE" are set as the SE detectors, and "L.A. 100" is selected in the selection box to the right of "+BSE" to set the mode to backscattered electron imaging. In the same "Basic" tab of the operations panel, the probe current of the electro-optical conditions block is set to "Normal", the focus mode to "UHR", and the WD to "4.5 mm". The "ON" button of the acceleration voltage display part of the control panel is pressed to apply acceleration voltage.

(3) Focal Point Adjustment

The "COARSE" focus knob on the operations panel is rotated, and the aperture alignment is adjusted once the image is somewhat focused. "Align" is clicked on the control panel to display an alignment dialog, and "Beam" is selected. The STIGMA/ALIGNMENT knob (X,Y) on the operations panel is rotated to move the displayed beam to the center of the concentric circles. "Aperture" is then selected, and the STIGMA/ALIGNMENT knob (X,Y) is rotated step by step to stop or minimize the movement of the image. The aperture dialog is closed, and the image is focused in autofocus. The magnification is then set to 80,000× (80k), and the focus knob and STIGMA/ALIGNMENT knob are used as before to adjust the focus. The image is then focused again in autofocus. This operation is repeated to focus the image.

(4) Image Storage

The brightness is adjusted in ABC mode, and 640×480 pixel images are photographed and stored. The following analysis is then performed using these image files. One photograph is taken for each magnetic carrier, and at least 25 particles of the magnetic carrier are imaged.

(5) Image Analysis

The particle diameters of at least 500 inorganic fine particles A on the surface of the magnetic carrier are measured, and the number-average particle diameter is determined. In the present invention, Image-Pro Plus version 5.0 (Nippon Roper K.K.) image analysis software is used to binarize the images obtained by the methods described above and calculate the number-average particle diameter of the inorganic fine particles A.

<Method for Measuring Coverage Ratio of Magnetic Carrier Surface by Inorganic Fine Particles A>

The coverage ratio of the toner surface by the inorganic fine particles A is calculated as follows.

Elemental analysis of the toner surface is performed using the following equipment under the following conditions.

Measurement device: Quantum 2000 X-ray photoelectron spectrometer (ULVAC-PHI, Inc.)

X-ray source: Monochrome Al Kα

X-ray setting: 100 μmφ (25 W (15 KV))

Photoelectron extraction angle: 45°

Neutralization conditions: Neutralization gun combined with ion gun

Analysis region: 300×200 μm

Pass Energy: 58.70 eV

Step size: 0.125 eV

Analysis software: PHI Maltipak (ULVAC-PHI, Inc.)

The peaks of Sr (B.E. eV), Ba (B.E. eV), Ca (B.E. eV) and Mg (B.E. eV) are used here for calculating the quantitative value of atoms of the inorganic fine particles A. The resulting quantitative value of the atoms derived from the inorganic fine particles A is given here as X.

Next, the inorganic fine particles A alone are subjected to elemental analysis in the same way as the toner surface above, and the resulting quantitative value of the elements derived from the inorganic fine particles A is given as Y.

The coverage rate of the toner surface by the inorganic fine particles A is then defined by the following formula using X and Y above.

$$\text{Coverage rate (\%)} = X/Y \times 100$$

Measurement is preferably performed at least twice to improve the accuracy of the measurement. If the externally added inorganic fine particles A are available when determining the quantitative value, it can be used for measurement.

<Rectangular Parallelepiped Particle Content of Inorganic Fine Particles A>

1,000 inorganic fine particles A with a particle diameter of 10 nm to 60 nm are counted from the above electron microscope image. The number of these particles having a rectangular parallelepiped particle shape is counted, and the number percentage per 1,000 inorganic fine particles A is calculated.

The particle shape is considered to be rectangular parallelepiped if the particle is hexahedral.

(Method of Measurement from Inorganic Fine Particles A)

When measuring the rectangular parallelepiped particle content directly from the inorganic fine particles A, electron microscope images are taken under the same conditions as when observing the magnetic carrier. 1,000 inorganic fine particles A with a particle diameter of 10 nm to 60 nm are counted. The number of these particles having a rectangular parallelepiped particle shape is counted, and the number percentage relative to all of the inorganic fine particles A is calculated.

<Measuring Dielectric Constant of Inorganic Fine Particles A>

After calibration at frequencies of 1 kHz and 1 MHz, the complex dielectric constant is measured at 1 MHz using a 284A Precision LCR Meter (Hewlett-Packard Company). 39,200 kPA (400 kg/cm$^2$) of load is applied for 5 minutes to the inorganic fine particles A to be measured, to mold a disk-shaped measurement sample of 25 mm in diameter and 0.07 mm thick. This measurement sample is mounted on an ARES (Rheometric Scientific F. E. Ltd.) equipped with a permittivity measurement jig (electrode) of 25 mm in diameter, and measured at a frequency of 1 MHz under 0.49 N (50 g) of load in a 25° C. atmosphere to obtain the dielectric constant of the inorganic fine particles A.

<Hydrophobicity of Inorganic Fine Particles A>

The hydrophobicity of the inorganic fine particles A is measured with a WET-100P powder wettability tester (RH-ESCA Co., Ltd.).

A fluorine resin-coated spindle-type rotor with a length of 25 mm and a maximum body diameter of 8 mm is placed in a cylindrical glass container of 5 cm in diameter and 1.75 mm thick. 70 mL of a hydrous methanol solution of 50 vol % methanol and 50 vol % water is placed in the cylindrical container, 0.5 g of the inorganic fine particles A is added, and the container is set in the powder wettability tester. This is stirred at a rotation of 3.3/sec with a magnetic stirrer as methanol is added to the solution at a rate of 0.8 mL/min through the powder wettability tester. The transmittance is measured with light at wavelength 780 nm, and a value represented by the volume percentage of methanol when transmittance reaches 50% (methanol volume/mixture volume)×100) is given as the hydrophobicity. The initial volume ratio of methanol and water is adjusted appropriately according to the hydrophobicity of the sample.

<Method for Measuring True Density of Inorganic Fine Particles A>

The true density of the inorganic fine particles A is measured using AccuPyc 1330 dry automatic density meter (Shimadzu Corporation).

1 g of a sample that has been left for 24 hours in a 23° C./50% RH environment is weighed exactly, placed in a measurement cell (10 cm$^3$), and inserted into the main unit sample chamber. Measurement can be performed automatically by inputting the mass (weight) of the sample into the main unit, and then starting measurement. The automatic measurement conditions use helium gas adjusted to 20.000 psig (2.392×10$^2$ kPa). The inside of the sample chamber is purged 10 times, and then purged repeatedly with helium gas until it reaches an equilibrium state, which is considered to be a state in which the pressure change within the sample chamber reaches 0.005 psig/min (3.447×10$^{-2}$ kPa/min). The pressure of the main unit sample chamber is measured in the equilibrium state. The sample volume is calculated from the pressure change when the equilibrium state is reached, and the true density of the sample is calculated according to the following formula:

True sample density (g/cm$^3$)=sample mass (g)/sample volume (cm$^3$)

This automatic measurement is repeated 5 times, and the average of the measured values is given as the true density (g/cm$^3$) of the inorganic fine particles A.

<Method for Measuring Volume-Average Particle Diameters (D50) of Magnetic Carrier Particle and Magnetic Carrier Core Particle >

To measure the particle-size distributions and volume-average particle diameters (D50) of the magnetic carrier particle and magnetic carrier core particle, a sample supply unit for dry measurement (Turbotrac one-shot dry sample conditioner, Nikkiso Co., Ltd.) is mounted on a Microtrac MT3300FX laser diffraction/scattering particle size distribution analyzer (Nikkiso Co., Ltd.). For the Turbotrac supply conditions, a dust collector is used as the vacuum source, with an air quantity of about 33 L/sec and a pressure of about 17 kPa. Control is performed automatically on the software. The particle diameter is the 50% particle diameter (D50), which is the cumulative value of the volume average. Control and analysis are performed using the accessory software (Version 10.3.3-202D). The measurement conditions are as follows.

SetZero time: 10 seconds
Measurement time: 10 seconds
Number of measurements: 1
Particle refractive index: 1.81%
Particle shape: Non-spherical
Measurement maximum: 1408 µm
Measurement minimum: 0.243 µm
Measurement environment: 23° C., 50% RH <Isolating Resin Coat Layer from Magnetic Carrier and Separating Coating Resins A and B in Resin Coat Layer>

A method of taking 1.0 g of magnetic carrier in a cup and eluting the coating resin with 10.0 g of toluene is used as the method of isolating the resin coat layer from the magnetic carrier.

The eluted resin is allowed to dry, dissolved in 10.0 g of tetrahydrofuran (THF), and separated with the following equipment.

[Equipment Configuration]
LC-908 (Japan Analytical Industry Co., Ltd.)
JRS-86 (Japan Analytical Industry Co., Ltd., repeat injector)
JAR-2 (Japan Analytical Industry Co., Ltd., autosampler)
FC-201(Gilson, fraction collector)
[Column Configuration]
JAIGEL-1H to 5H (20φ×600 mm: preparative columns) (Japan Analytical Industry Co., Ltd.)
[Measurement Conditions]
Temperature: 40° C.
Solvent: THF
Flow rate: 5 mL/min
Detector: RI Based on the molecular weight distribution of the coating resin, the elution times for the peak molecular weights (Mp) of the coating resin A and coating resin B are determined in advance using the resin configuration specified by the following methods, and the respective resin components are separated before and after. The solvent is then removed, and the resins are dried to obtain a coating resin A and coating resin B.

The atomic groups can be identified from the absorption light wave numbers with a Fourier transform infrared spectrometer (Spectrum One: PerkinElmer), to specify the resin compositions of the coating resin A and coating resin B.

<Measuring Weight-Average Molecular Weights (Mw), Peak Molecular Weights (Mp) and Content Ratios of Resin Coat Layer and Coating Resins A and B in Resin Coat Layer>

The weight-average molecular weights (Mw) and peak molecular weights (Mp) of the coating resin A, coating resin B and resin coat layer are measured by the following procedures using gel permeation chromatography (GPC).

Measurement samples are first prepared as follows.

A sample (coating resin isolated from magnetic carrier or coating resin A or coating resin B separated with separation equipment) is mixed at a concentration of 5 mg/mL with tetrahydrofuran (THF), and left for 24 hours at room temperature to dissolve the sample in tetrahydrofuran. This is then passed through a sample filter (Maishori Disk H-25-2, Tosoh Corp.) and used as a GPC sample.

This is then measured under the following measurement conditions using a GPC measurement unit (HLC-8120GPC, Tosoh Corp.) in accordance with the attached operating manual.

(Measurement Conditions)
System: HLC8120 GPC (Tosoh Corp.)
Columns: Shodex KF-801, 802, 803, 804, 805, 806, 807 (total 7) (Showa Denko K. K.)
Eluent: THF
Flow rate: 1.0 mL/min
Oven temperature: 40.0° C.
Sample injection volume: 0.10 mL A molecular weight calibration curve prepared using standard polystyrene resin (product name: TSK standard polystyrene F-850, F-450, F-288, F-128, F-80, F-40, F-20, F-10, F-4, F-2, F-1, A-5000, A-2500, A-1000, A-500, Tosoh Corp.) is used for calculating the weight-average molecular weights (Mw) and peak molecular weights (Mp) of the samples.

Figure 3:
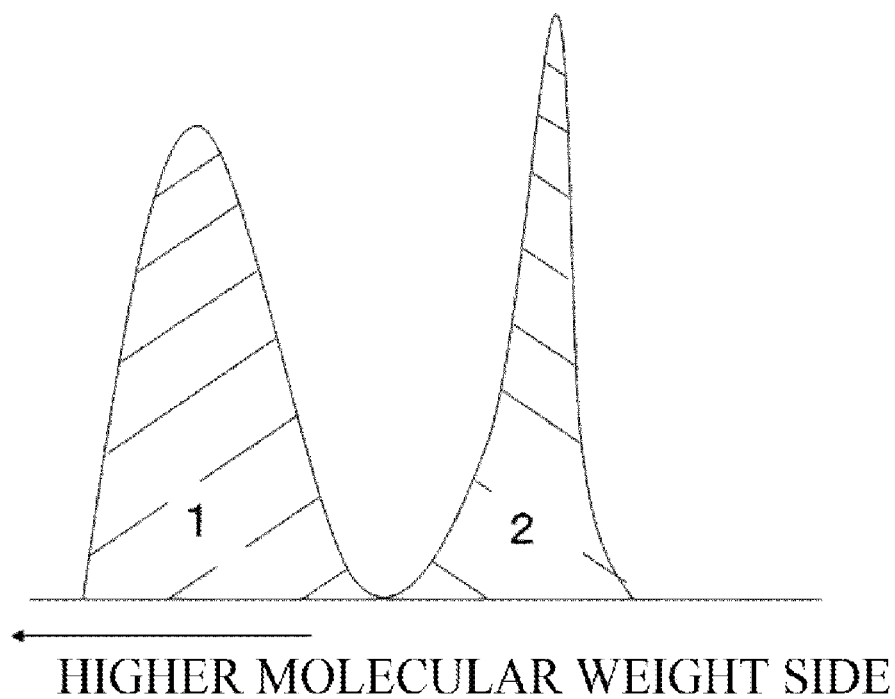
FIG. 3 shows an outline of a method for specifying coating resin content in a GPC molecular weight distribution curve.
Figure 4:
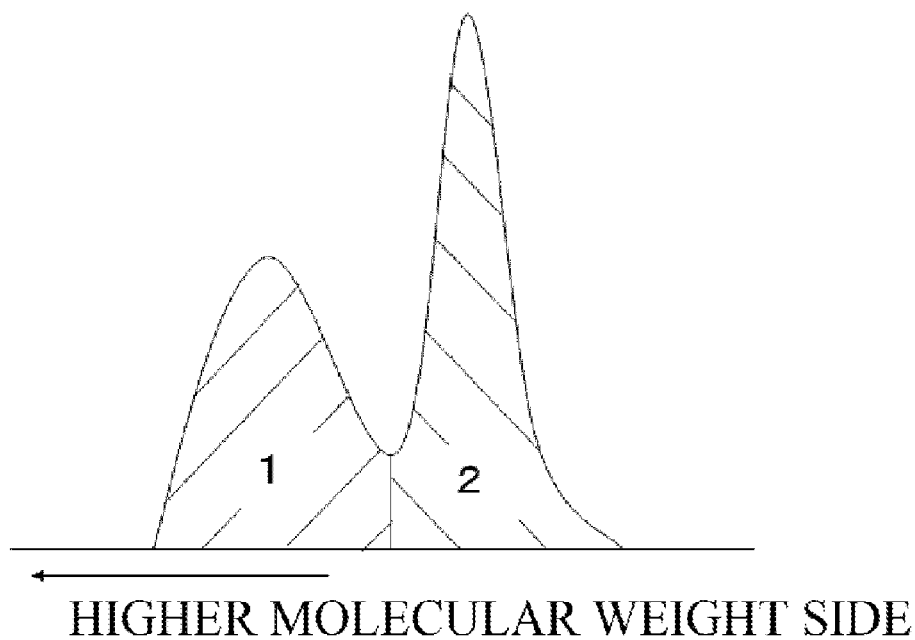
FIG. 4 shows an outline of a method for specifying coating resin content in a GPC molecular weight distribution curve.

The content ratios are determined from the peak area ratios in molecular weight distribution measurement. As shown in FIG. 3, when regions 1 and 2 are entirely separate, the content ratios of the resins can be determined from the area ratios of the regions. When the regions overlap as shown in FIG. 4, they can be divided with a line drawn perpendicularly from the inflection point of the GPC molecular weight distribution curve to the horizontal axis, and the content ratios can be determined from the area ratios of the regions 1 and 2 shown in FIG. 4.

<Isolating Inorganic Fine Particles A from Magnetic Carrier and Separating Surface Treatment Agent from Inorganic Fine Particles A>

The following method is adopted for isolating the inorganic fine particles A from the magnetic carrier.

30 mL of ion-exchange water is placed in a 100 mL glass flat-bottomed beaker. 0.3 mL of a dilution of Contaminon N (a 10% by mass aqueous solution of a pH 7 neutral detergent for washing precision instruments, comprising a nonionic surfactant, an anionic surfactant and an organic builder, manufactured by Wako Pure Chemical Industries, Ltd.) diluted thrice by mass with ion-exchange water is added to this to prepare a Contaminon N solution.

An ultrasonic disperser (Ultrasonic Dispersion System Tetra 150, Nikkaki Bios Co., Ltd.) with an electrical output of 120 W equipped with two built-in oscillators having an oscillating frequency of 50 kHz with their phases shifted by 180° from each other is prepared. 3.3 L of ion-exchange water is placed in the tank of the ultrasound disperser, and 2 mL of Contaminon N is added to the tank.

The beaker containing the Contaminon N solution is set in the beaker-fixing hole of the ultrasonic disperser, and the ultrasonic disperser is operated. The height position of the beaker is adjusted so as to maximize the resonant condition of the liquid surface of the electrolytic aqueous solution in the beaker.

The electrolytic aqueous solution in the beaker containing the Contaminon N solution is exposed to ultrasound as 1.0 g of the magnetic carrier is added and dispersed. Ultrasound dispersion is then continued for 30 seconds. During ultrasound dispersion, the water temperature in the tank is adjusted appropriately to 10° C. to 40° C.

A magnet is then brought near the beaker containing the magnetic carrier to attract the carrier through the beaker. The supernatant in the beaker (Contaminon N solution) is collected in this state. The collected supernatant is filtered, and the solids are washed with 5 g of ion-exchange water to obtain an inorganic fine particles A.

The following method is adopted for separating the surface treatment agent from the inorganic fine particles A.

0.5 g of the inorganic fine particles A is placed in a cup, and the surface treatment agent is eluted with 10.0 g of tetrahydrofuran.

The eluted surface treatment agent is allowed to dry to separate the surface treatment agent.

<Method for Measuring Weight-Average Particle Diameter (D4)>

The weight-average particle diameter (D4) of the toner particle is calculated by analyzing measurement data resulting from a measurement, in 25,000 effective measurement channels, using a precision particle diameter distribution measurement apparatus "Coulter Counter Multisizer 3" (registered trademark, by Beckman Coulter, Inc.) relying on a pore electrical resistance method and equipped with a 100 μm aperture tube, and by using dedicated software "Beckman Coulter Multisizer 3, Version 3.51" (by Beckman Coulter, Inc.) ancillary to the apparatus, for setting measurement conditions and analyzing measurement data.

The aqueous electrolyte solution used in the measurements can be prepared through dissolution of special-grade sodium chloride at a concentration of about 1 mass % in ion-exchanged water; for instance "ISOTON II" (by Beckman Coulter, Inc.) can be used herein.

The dedicated software is set up as follows prior to measurement and analysis.

In the "Changing Standard Operating Mode (SOM)" screen of the dedicated software, a total count of the control mode is set to 50,000 particles, a number of runs is set to one, and a Kd value is set to a value obtained using "Standard particles 10.0 μm" (by Beckman Coulter, Inc.). The threshold/noise level measuring button is pressed to thereby automatically set a threshold value and a noise level. Then the current is set to 1600 μA, the gain is set to 2, the electrolyte solution is set to ISOTON II, and flushing of the aperture tube following measurement is ticked.

In the "setting conversion from pulses to particle size" screen of the dedicated software, the bin interval is set to a logarithmic particle diameter, the particle diameter bin is set to 256 particle diameter bins, and the particle diameter range is set to range from 2 μm to 60 μm.

Specific measurement methods are as described below.

(1) Herein about 200 mL of the aqueous electrolyte solution is placed in a 250 mL round-bottomed glass beaker ancillary to Multisizer 3. The beaker is set on a sample stand and is stirred counterclockwise with a stirrer rod at 24 rotations per second. Debris and air bubbles are then removed from the aperture tube by the "aperture tube flush" function of the dedicated software.

(2) Then about 30 mL of the aqueous electrolyte solution is placed in a 100 mL flat-bottomed glass beaker, and about 0.3 mL of a dilution is added thereto as a dispersant. The dilution contains a dispersant "Contaminon N" (10 mass % aqueous solution of a pH 7 neutral detergent for cleaning of precision instruments, comprising a nonionic surfactant, an anionic surfactant and an organic builder, by Wako Pure Chemical Industries, Ltd.) diluted thrice by mass in ion-exchanged water.

(3) A predetermined amount of ion-exchanged water is placed in a water tank of an ultrasonic disperser having an electrical output of 120 W and internally equipped with two oscillators that oscillate at a frequency of 50 kHz and are disposed at a phase offset of 180 degrees, and about 2 mL of the above Contaminon N are added into the water tank. The ultrasonic disperser that is used is "Ultrasonic Dispersion System Tetora 150" (by Nikkaki Bios Co., Ltd.).

(4) The beaker of (2) is set in a beaker-securing hole of the ultrasonic disperser, which is then operated. The height position of the beaker is adjusted so as to maximize a resonance state at the liquid level of the aqueous electrolyte solution in the beaker.

(5) With the aqueous electrolyte solution in the beaker of (4) being ultrasonically irradiated, about 10 mg of the toner particles are added little by little to the aqueous electrolyte solution, to be dispersed therein. The ultrasonic dispersion treatment is further continued for 60 seconds. The water temperature of the water tank at the time of ultrasonic dispersion is adjusted as appropriate to lie in the range of from 10° C. to 40° C.

(6) The aqueous electrolyte solution of (5) containing the dispersed toner particles is added dropwise, using a pipette, to the round-bottomed beaker of (1) set on the sample stand, to adjust the measurement concentration to about 5%. A measurement is then performed until the number of measured particles reaches 50,000.

(7) Measurement data is analyzed using the dedicated software ancillary to the apparatus, to calculate the weight-average particle diameter (D4). The "average diameter" in the analysis/volume statistics (arithmetic average) screen, when graph/% by volume is selected in the dedicated software, yields herein the weight-average particle diameter (D4).

<Method for Calculating Fine Powder Content>

The number-based fine powder content (number %) of the toner particles is calculated as follows.

For example, the number % of particles of not more than 4.0 µm in size in the toner particles is determined after measuring with the Multisizer 3 above by (1) setting to graph/number % on the dedicated software to display the chart of measurement results as a number %/o display. (2) "<" is then checked in the particle size setting part of the format/particle size/particle size statistics screen, and "4" is entered below that in the particle size input part. (3) The number displayed in the "<4 µm" display part when the analysis/count statistics (arithmetic mean) screen is displayed is then given as the number % of particles with a particle size of not more than 4.0 µm in the toner particles.

<Method for Calculating Coarse Powder Content>

The volume-based coarse powder content (vol %) of the toner particles is calculated as follows.

For example, the vol % of particles of 10.0 µm or more in size in the toner particles is determined after measuring with the Multisizer 3 above by (1) setting to graph/vol % on the dedicated software to display the chart of measurement results as a vol % display. (2) ">" is then checked in the particle size setting part of the format/particle size/particle size statistics screen, and "10" is entered below that in the particle size input part. (3) The number displayed in the ">10 µm" part when the analysis/volume statics (arithmetic mean) screen is displayed is then given as the vol % of particles with a particle size of at least 10.0 µm in the toner particles.

EXAMPLES

The present invention is explained in more detail below with reference to examples, but the invention is not limited to the examples. All parts in the examples and comparative examples are based on mass unless otherwise specified.

Inorganic fine particles A were prepared as follows. The manufacturing conditions for the inorganic fine particles A1 to A12 are shown in Table 1.

Manufacturing Example of Inorganic Fine Particles A1

Step S101:

Metatitanic acid obtained by the sulfuric acid method was subjected to de-ironing bleaching treatment, after which desulfurization was performed by adding a sodium hydroxide aqueous solution to a pH of 9.0, and the pH was then neutralized to pH 5.8 with hydrochloric acid, followed by filtration and water washing. Water was added to the washed cake to obtain a 1.85 mol/L slurry of $TiO_2$, and hydrochloric acid was added to a pH of 1.4 to perform peptization.

Step S102:

1.88 mol (as $TiO_2$) of the desulfurized and peptized metatitanic acid was collected, and placed in a 3 L reactor.

Step S103:

2.16 mol of strontium chloride aqueous solution was added to the peptized metatitanic acid slurry, to bring the $SrCl_2/TiO_2$ molar ratio to 1.15.

Step S104:

The $TiO_2$ concentration was adjusted to 1.039 mol/L.

Step S105:

This was then heated to 90° C. under stirring and mixing, after which 440 mL of a 10 mol/L sodium hydroxide aqueous solution was added over the course of 40 minutes.

Step S106:

This was stirred continuously for 45 minutes at 95° C. to stop the reaction.

Step S107:

The reaction slurry was cooled to 50° C., hydrochloric acid was added to a pH of 4.9, and stirring was continued for 20 minutes.

Step S108:

The resulting precipitate was washed by decantation, filtered and separated, and then dried for 8 hours in atmosphere at 120° C.

Step S109:

300 g of the dried product was then placed in a dry particle compounding device (Hosokawa Micron Corp., NOBILTA NOB-130), and treated for 10 minutes at a treatment temperature of 30° C. with a rotary processing blade at 90 m/sec.

Step S110:

Hydrochloric acid was added to the dried product to a pH of 0.1, and stirring was continued for 1 hour. The resulting precipitate was washed by decantation.

Step S111:

A slurry containing the precipitate was adjusted to 40° C., and hydrochloric acid was added to adjust the pH to 2.5.

Step S112:

Isobutyl trimethoxysilane in the amount of 4.6 mass % and trifluoropropyl trimethoxysilane in the amount of 4.6% of the solids were mixed for 1 hour and then added, and stirring was maintained continuously for 10 hours.

Step 113:

A 5 mol/L sodium hydroxide solution was added to adjust the pH to 6.5, and stirring was continued for 1 hour.

Step 114:

After filtration and washing, the resulting cake was dried for 8 hours in a 120° C. atmosphere to obtain inorganic fine particles A1. The physical properties are shown in Table 2.

Manufacturing Examples of Inorganic Fine Particles A2 to A12

Inorganic fine particles A2 to A12 were obtained in the same way as the inorganic fine particles A1 except that the manufacturing conditions were changed as shown in Table 1. The physical properties are shown in Table 2.

Titanium oxide surface treatment was also performed as for the inorganic fine particles A7.

TABLE 1

| Inorganic fine particles | S101 Crushing pH | S103 Metal Mx source other than titanium | $MxCl_2/TiO_2$ molar ratio | S104 $TiO_2$ concentration (mol/L) | S105 Heating temperature (° C.) | NaOH aqueous solution concentration (mol/L) | NaOH aqueous solution dripping time (min) | S106 Stirring temperature after dripping (° C.) | Stirring time (min) |
|---|---|---|---|---|---|---|---|---|---|
| A1 | 1.4 | $SrCl_2$ | 1.15 | 1.039 | 90 | 10 | 40 | 95 | 45 |
| A2 | 1.4 | $SrCl_2$ | 1.15 | 1.039 | 90 | 10 | 50 | 95 | 45 |
| A3 | 1.4 | $SrCl_2$ | 1.15 | 1.039 | 90 | 10 | 60 | 95 | 45 |
| A4 | 1.4 | $SrCl_2$ | 1.15 | 1.039 | 90 | 10 | 40 | 95 | 30 |
| A5 | 1.4 | $SrCl_2$ | 1.15 | 1.039 | 90 | 10 | 40 | 95 | 50 |
| A6 | 1.4 | $BaCl_2$ | 1.15 | 1.039 | 90 | 10 | 40 | 95 | 45 |
| A7 | 1.4 | $SrCl_2$ | 1.15 | 1.039 | 90 | 10 | 40 | 95 | 60 |
| A8 | 1.4 | $CaCl_2$ | 1.15 | 1.039 | 90 | 10 | 40 | 95 | 45 |
| A9 | 1.4 | $MgCl_2$ | 1.15 | 1.039 | 90 | 10 | 40 | 95 | 45 |
| A10 | 1.4 | $MgCl_2$ | 1.15 | 1.039 | 90 | 10 | 40 | 95 | 45 |
| A11 | 1.4 | $MgCl_2$ | 1.15 | 1.039 | 90 | 10 | 40 | 95 | 45 |
| A12 | 1.4 | $SrCl_2$ | 1.15 | 1.039 | 90 | 10 | 40 | 95 | 45 |

| Inorganic fine particles | S107 System pH | S110 Treatment time (h) | Surface treatment agent 1 Type of surface treatment agent | mass % | Surface treatment agent 2 Type of surface treatment agent | mass % |
|---|---|---|---|---|---|---|
| A1 | 4.9 | 1 | Isobutyl trimethoxysilane | 4.6 | Trifluoropropyl trimethoxysilane | 4.6 |
| A2 | 4.9 | 1 | n-Octyl trimethoxysilane | 4.6 | Trifluoropropyl trimethoxysilane | 4.6 |
| A3 | 4.9 | 1 | n-Octyl trimethoxysilane | 5.0 | — | — |
| A4 | 4.9 | 1 | n-Hexyl trimethoxysilane | 4.0 | — | — |
| A5 | 4.9 | 1 | n-Dodecyl trimethoxysilane | 5.0 | — | — |
| A6 | 4.9 | 1 | — | — | Trimethoxy pentafluorophenylsilane | 9.0 |
| A7 | 4.9 | 1 | Isobutyl trimethoxysilane | 4.0 | — | — |
| A8 | 4.9 | 1 | Ethyl trimethoxysilane | 3.0 | — | — |
| A9 | 4.9 | 1 | 3-Isocyanabpropyl trimethoxysilane | 2.0 | — | — |
| A10 | 4.9 | 1 | 3-Acryloxypropyl trimethoxysilane | 2.0 | — | — |
| A11 | 4.9 | 1 | — | — | Trifluoropropyl trimethoxysilane | 3.0 |
| A12 | 4.9 | 1 | Methyl timethoxysilane | 1.0 | — | — |

(In the Table, S1xx corresponds to "Step S1xx" in the Description)

TABLE 2

| Inorganic fine particles | Compositional formula | Number-average particle diameter (nm) | True density (g/mL) | Rectangular parallelepiped particle content (number %) | Dielectric constant (pF/m) | SP2 | Hydrophobicity |
|---|---|---|---|---|---|---|---|
| A1 | $SrTiO_3$ | 40 | 5.1 | 70 | 45 | 7.09 | 75 |
| A2 | $SrTiO_3$ | 40 | 5.1 | 75 | 45 | 7.31 | 75 |
| A3 | $SrTiO_3$ | 40 | 5.1 | 70 | 45 | 7.67 | 60 |
| A4 | $SrTiO_3$ | 40 | 5.1 | 70 | 45 | 7.53 | 50 |
| A5 | $SrTiO_3$ | 40 | 5.1 | 65 | 45 | 7.85 | 55 |
| A6 | $BaTiO_3$ | 40 | 6.0 | 60 | 70 | 7.97 | 80 |
| A7 | $SrTiO_3$ | 40 | 5.1 | 65 | 45 | 7.23 | 50 |
| A8 | $CaTiO_3$ | 40 | 4.0 | 55 | 30 | 7.00 | 30 |
| A9 | $MgTiO_3$ | 40 | 3.4 | 55 | 20 | 9.00 | 25 |
| A10 | $MgTiO_3$ | 10 | 3.4 | 50 | 20 | 9.20 | 25 |
| A11 | $MgTiO_3$ | 60 | 3.4 | 50 | 20 | 6.95 | 25 |
| A12 | $SrTiO_3$ | 40 | 5.1 | 50 | 45 | 6.70 | 10 |

TABLE 2-continued

| Inorganic fine particles | Compositional formula | Number-average particle diameter (nm) | True density (g/mL) | Rectangular parallelepiped particle content (number %) | Dielectric constant (pF/m) | SP2 | Hydrophobicity |
|---|---|---|---|---|---|---|---|
| Titanium oxide | $TiO_2$ | 100 | 3.9 | 0 | 30 | 7.23 | 50 |

Manufacturing Example of Resin A-1

The raw materials shown in Table 3 (total 109.0 parts) were added to a 4-necked flask equipped with a reflux condenser, a thermometer, a nitrogen introduction pipe and a grinding type stirring device, 100.0 parts of toluene, 100.0 parts of methyl ethyl ketone and 2.4 parts of azobisisovaleronitrile were added, and the mixture was maintained at 80° C. in a nitrogen flow for 10 hours to obtain a coating resin A-1 solution (solid content: 35 mass %).

Coating resins A-2 to A-11 were also obtained in the same way using the raw materials shown in Table 3.

Manufacturing Example of Resin B-1

500 parts of xylene were loaded into an autoclave, and the system was purged with nitrogen and then heated to 185° C. under stirring in a sealed state. A mixed solution of the raw materials shown in Table 3 with 50 parts of di-t-butyl peroxide and 200 parts of xylene was dripped in continuously for 3 hours with the internal temperature of the autoclave controlled at 185° C. to perform polymerization. This was then maintained at the same temperature for 1 hour to complete polymerization and remove the solvent, to obtain a resin B-1.

TABLE 3

| Coating resin | Mw of Resin | Mp of Resin | Composition of Resin | | | |
|---|---|---|---|---|---|---|
| | | | CHMA (mol) | MMA (mol) | Macromonomer (mol) | Styrene (mol) |
| A-1 | 40000 | 35000 | 98.5 | 1.0 | 0.5 | — |
| A-2 | 41000 | 34500 | 79.4 | 20.0 | 0.6 | — |
| A-3 | 39500 | 33000 | 69.4 | 30.0 | 0.6 | — |
| A-4 | 42000 | 30000 | 98.0 | 1.5 | 0.5 | — |
| A-5 | 38500 | 29000 | 97.5 | 2.0 | 0.5 | — |
| A-6 | 39000 | 34000 | 96.5 | 3.0 | 0.5 | — |
| A-7 | 41000 | 33000 | 100.0 | 0.0 | 0.0 | — |
| A-8 | 40000 | 31000 | 34.6 | 65.0 | 0.4 | — |
| A-9 | 41500 | 32000 | 79.5 | 20.0 | 0.5 | — |
| A-10 | 42000 | 37000 | 9.5 | 90.0 | 0.5 | — |
| A-11 | 40000 | 36000 | 99.1 | 0.5 | 0.4 | — |
| B-1 | 3000 | 2100 | — | 1.0 | — | 99.0 |

CHMA: Cyclohexyl methacrylate
MMA: Methyl methacrylate
Macromonomer: Methyl methacrylate polymer having methacryloyl group at the terminal thereof as a reactive C—C double bond, Mw: 5,000

Manufacturing Example of Magnetic Carrier Core Particle 1

Step 1 (Weighing and Mixing Step)

| $Fe_2O_3$ | 68.3 mass % |
|---|---|
| $MnCO_3$ | 28.5 mass % |
| $Mg(OH)_2$ | 2.0 mass % |
| $SrCO_3$ | 1.2 mass % |

These ferrite raw materials were weighed, 20 parts of water were added to 80 parts of the ferrite raw materials, which were then wet mixed for 3 hours with a ball mill using 10-mm diameter (φ) zirconia to prepare a slurry. The slurry had a solids concentration of 80 mass %.

Step 2 (Pre-Firing Step)

The mixed slurry was dried with a spray dryer (Ohkawara Kakohki Co., Ltd.), and then fired for 3.0 hours at 1,050° C. in a batch electric furnace in a nitrogen atmosphere (oxygen concentration 1.0 vol %) to prepare a pre-fired ferrite.

Step 3 (Pulverization Step)

The pre-fired ferrite was pulverized to about 0.5 mm with a crusher, and water was added to prepare a slurry. The slurry had a solids concentration of 70 mass %. This was pulverized for 3 hours in a wet ball mill with ⅛-inch stainless steel beads to obtain a slurry. This slurry was then pulverized for 4 hours in a wet bead mill using 1-mm diameter zirconia to obtain a pre-fired ferrite slurry with a volume-based 50% particle diameter (D50) of 1.3 μm.

Step 4 (Granulation Step)

1.0 part of ammonium polycarbonate as a dispersant and 1.5 parts of polyvinyl alcohol as a binder were added to 100 parts of the pre-fired ferrite slurry, and the mixture was granulated into spherical particles with a spray dryer (Ohkawara Kakohki Co., Ltd.) and dried. The resulting granulated product was subjected to particle size adjustment, and heated for 2 hours at 700° C. with a rotary electric furnace to remove organic material including the dispersant and binder.

Step 5 (Firing Step)

This was fired in a nitrogen atmosphere (oxygen concentration 1.0 vol %) by raising the temperature from room temperature to the firing temperature (1,100° C.) over the course of 2 hours, and then maintaining it at 1,100° C. for 4 hours. The temperature was then lowered to 60° C. over the course of 8 hours, the atmosphere was returned from nitrogen to air, and the product was removed at 40° C. or less.

Step 6 (Selection Step)

Aggregated particles were crushed, the product was sieved through a 150-μm sieve to remove coarse particles and air classified to remove fine particles, and the low-magnetism component was removed by magnetic separation to obtain a porous magnetic core particle.

Step 7 (Filling Step)

100 parts of the porous magnetic core particle were placed in the stirring container of a mixing stirrer (Dalton Corp., universal mixer NDMV), and maintained at 60° C. as 5 parts of a filler resin consisting of 95.0 mass % methyl silicone oligomer and 5.0 mass % γ-aminopropyl trimethoxysilane were dripped in at normal pressure.

After completion of dripping, the time was adjusted as stirring was continued, and the temperature was raised to 70° C. to fill the porous magnetic core particles with the resin composition.

The resin-filled magnetic core particles obtained after cooling were transferred to a mixer having a spiral blade in a rotatable mixing container (Sugiyama Heavy Industrial, drum mixer UD-AT), and heated to 220° C. under mixing at a ramp rate of 2° C./min in a nitrogen atmosphere. Heating mixing was then continued for 50 minutes at 140° C.

This was then cooled to room temperature, the ferrite particle with the filled and cured resin was taken out, and non-magnetic material was removed with a magnetic separator. Coarse particles were further removed with a vibrating sieve to obtain a resin-filled magnetic carrier core particle 1.

Manufacturing Example of Magnetic Carrier Core Particle 2

A silane coupling agent (3-(2-aminoethylamino)propyl trimethoxysilane) was added in the amount of 4.0 mass % to a magnetite powder with a number-average particle diameter of 0.30 µm, and subjected to high-speed mixing and stirring at 100° C. or more in a container.

| | |
|---|---|
| Phenol | 10 parts |
| Formaldehyde solution (40% formaldehyde, 10% methanol, 50% water) | 6 parts |
| Treated magnetite | 84 parts |

These materials were placed in a flask with 5 parts of 28% ammonia water and 20 parts of water, and stirred and mixed as the temperature was raised to 85° C. over 30 minutes and maintained while a polymerization reaction was performed for 3 hours, and the resulting phenol resin was cured. The cured phenol resin was then cooled to 30° C., and water was further added, after which the supernatant was removed, and the precipitate was water washed and air dried. This was then dried at 60° C. under reduced pressure (not more than 5 mmHg) to obtain a spherical magnetic carrier core particle 2 in which the magnetic body was dispersed.

Manufacturing Examples of Magnetic Carrier Particles C1 to C12

| | |
|---|---|
| Magnetic carrier core particle 1 | 100 parts |
| Resin A-1 | 2.0 parts |

The resin A-1 was diluted to 20 times with toluene to prepare a thoroughly-mixed resin solution. The magnetic carrier core particle 1 was then placed in a planetary mixer maintained at 60° C. (Hosokawa Micron Corp., Nauta mixer VN), and the resin solution was added. Addition was performed by first adding half of the resin solution, and then performing solvent removal and coating operations for 30 minutes. The other half of the resin solution was then added, and solvent removal and coating operations were performed for 40 minutes.

The magnetic carrier particle coated with the resin coat layer was then transferred to a mixer having a spiral blade in a rotatable mixing container (Sugiyama Heavy Industrial, drum mixer UD-AT), and mixed by rotating the mixing container 10 times per minute as the particle was heat treated for 2 hours at 120° C. in a nitrogen atmosphere. The low-magnetic product was separated by magnetic separation from the resulting magnetic carrier particle, which was then passed through a 150-µm mesh sieve and classified with an air classifier to obtain a magnetic carrier particle C1. When the coating resin of the resulting magnetic carrier particle C1 was isolated and measured with a GPC measurement unit, the molecular weight distribution peaks shown in FIGS. 3 and 4 were obtained.

Magnetic carrier particles C2 to C12 were obtained in the same way as the magnetic carrier particle C1 except that the types and added amounts of the materials were changed as shown in Table 4.

TABLE 4

| Magnetic carrier particle | Magnetic carrier core particle | | Resin A | | Resin B | | SP1 |
|---|---|---|---|---|---|---|---|
| | No. | Properties | No. | Parts | No. | Parts | |
| C1 | 1 | Porous | A-1 | 2.0 | — | 0 | 18.98 |
| C2 | 1 | Porous | A-2 | 2.0 | — | 0 | 18.67 |
| C3 | 1 | Porous | A-3 | 2.0 | — | 0 | 18.51 |
| C4 | 1 | Porous | A-4 | 2.0 | — | 0 | 18.97 |
| C5 | 1 | Porous | A-5 | 1.6 | B-1 | 0.4 | 19.55 |
| C6 | 1 | Porous | A-6 | 2.0 | — | 0 | 18.94 |
| C7 | 1 | Porous | A-7 | 2.0 | — | 0 | 19.00 |
| C8 | 1 | Porous | A-8 | 2.0 | — | 0 | 17.95 |
| C9 | 1 | Porous | A-9 | 1.2 | B-1 | 0.8 | 19.96 |
| C10 | 2 | Magnetic body-dispersed | A-10 | 2.0 | — | 0 | 17.55 |
| C11 | 2 | Magnetic body-dispersed | A-11 | 0.7 | B-1 | 1.3 | 20.95 |
| C12 | 1 | Porous | A-11 | 0.1 | B-1 | 1.9 | 21.75 |

<Method for Manufacturing Magnetic Carriers E1 to E14>

100 parts of the magnetic carrier particle C1 and 0.05 parts of the inorganic fine particles A1 were loaded into a Turbula shaker, and shaken and stirred for 10 minutes to obtain a magnetic carrier E1.

Magnetic carriers E2 to E14 were obtained in the same way as the magnetic carrier E1 except that the types and added amounts of the materials were changed as shown in Table 5.

TABLE 5

| Magnetic carrier | Magnetic carrier particle | Inorganic fine particles | | Coverage ratio (atom %) | SP1-SP2 |
|---|---|---|---|---|---|
| | | Type | Parts | | |
| E1 | C1 | A1 | 0.05 | 10.0 | 11.89 |
| E2 | C2 | A2 | 0.06 | 11.0 | 11.36 |
| E3 | C3 | A3 | 0.05 | 9.0 | 10.84 |
| E4 | C4 | A4 | 0.04 | 8.0 | 11.44 |
| E5 | C5 | A5 | 0.04 | 7.0 | 11.70 |
| E6 | C6 | A6 | 0.08 | 14.0 | 10.97 |
| E7 | C7 | A7 | 0.09 | 15.0 | 11.77 |
| E8 | C8 | A8 | 0.13 | 18.0 | 10.95 |
| E9 | C9 | A9 | 0.13 | 17.0 | 10.96 |
| E10 | C10 | A10 | 0.03 | 5.0 | 8.35 |
| E11 | C11 | A11 | 0.15 | 20.0 | 14.00 |
| E12 | C3 | Titanium oxide particle | 0.05 | 10.0 | 11.28 |
| E13 | C12 | A12 | 0.05 | 10.0 | 15.05 |
| E14 | C3 | A1 | 0.25 | 30.0 | 11.42 |

Toner Manufacturing Example

| | |
|---|---|
| Binder resin (polyester, Tg: 57° C., acid value: 12 mgKOH/g, hydroxyl value: 15 mg KOH/g) | 100 parts |
| C.I. pigment blue 15:3 | 5.5 parts |
| 3,5-di-t-Butyl salicylic acid aluminum compound | 0.2 parts |
| Normal paraffin wax (melting point 90° C.) | 6 parts |

The materials of this formulation were thoroughly mixed in a HENSCHEL MIXER (FM-75J, Nippon Coke & Engineering Co., Ltd.), and then kneaded (kneaded product temperature 150° C. at discharge) at a feed rate of 10 kg/hr in a twin-screw kneader (PCM-30, Ikegai Co., Ltd.), the temperature of which was set at 130° C. The resulting kneaded product was cooled, crushed with a hammer mill, and then finely pulverized at a feed rate of 15 kg/hr with a mechanical pulverizer (T-250, Freund Turbo Corp.). Particles were then obtained having a weight-average particle diameter of 5.5 μm, and comprising 55.6 numbel % of particles with a particle diameter of not more than 4.0 μm and 0.8 vol % of particles with a particle diameter of at least 10.0 μm.

The resulting particles were sorted in a rotary classifier (TTSP100, Hosokawa Micron Corp.) to cut fine powder and coarse powder. A cyan toner particle 1 was thus obtained having a weight-average particle diameter of 6.0 μm, in which the abundance of particles with a particle diameter of not more than 4.0 μm was 27.8 number % and the abundance of particles with a particle diameter of at least 10.0 μm was 2.2 vol %.

The following materials were also loaded into a HENSCHEL MIXER (FM-75J, Nippon Coke & Engineering Co., Ltd.), and mixed for a mixing time of 3 minutes at a peripheral rotary blade speed of 35.0 (m/sec) to obtain a cyan toner 1 comprising a silica particle and a titanium oxide particle affixed to the surface of the cyan toner particle 1.

| | |
|---|---|
| Cyan toner particle 1: | 100 parts |
| Silica particle: (silica particle obtained by fumed method, surface treated with 1.5 mass % hexamethyl disilazane, and sorted to obtain the desired particle size distribution) | 3.5 parts |
| Titanium oxide particle: (metatitanic acid having anatase crystallinity, surface treated with octyl silane compound) | 0.5 parts |
| Strontium titanate particle (surface treated with octyl silane compound) | 0.5 parts |

Using the magnetic carriers 1 to 14 and the cyan toner 1 described above, the materials were shaken in a shaker (YS-8D, Yayoi Co., Ltd.) to a toner concentration of 8%, to prepare 300 parts each of two-component developers 1 to 14. The shaker amplitude conditions were 200 rpm for 2 minutes.

Meanwhile, 90 parts of the cyan toner 1 were added to 10 parts of the magnetic carrier 1 to 14, and mixed for 5 minutes in a V-type mixer in a normal temperature, normal humidity (23° C., 50% RH) environment to obtain replenishing developers 1 to 14. The details of the two-component developers are shown in Table 6.

<Examples 1 to 11 and Comparative Examples 1 to 3>

A modified machine of a full color copier imagePRESS C800 (Canon Inc.) was used as the image-forming device for evaluation. This image-forming device has a photosensitive member for forming an electrostatic latent image as an image-bearing member, and the electrostatic latent image on the photosensitive member is developed as a toner image with the two-component developer in a developing step. The developed toner image is then transferred to an intermediate transfer member, and the toner image on the intermediate transfer member is subsequently transferred to a paper in a transfer step, and the toner image is fixed on the paper by heat in a fixing step. The two-component developers 1 to 14 were each loaded into the developing device of the cyan station of this image-forming device, and evaluated. The evaluation results are shown in Table 6.

TABLE 6

| | Two-component developer | | | Durable stability | | Image uniformity | | Fogging | |
|---|---|---|---|---|---|---|---|---|---|
| | Toner No. | Magnetic carrier No. | | ΔE | Evaluation | S.D. | Evaluation | ΔE | Evaluation |
| Example 1 | 1 | 1 | E1 | 0.03 | A | 1.3 | A | 0.4 | A |
| Example 2 | 2 | 1 | E2 | 0.04 | A | 1.6 | A | 0.6 | A |
| Example 3 | 3 | 1 | E3 | 0.06 | B | 1.7 | A | 0.8 | A |
| Example 4 | 4 | 1 | E4 | 0.08 | B | 2.5 | B | 0.8 | A |
| Example 5 | 5 | 1 | E5 | 0.07 | B | 3.0 | B | 0.7 | A |
| Example 6 | 6 | 1 | E6 | 0.08 | B | 3.5 | B | 1.3 | B |
| Example 7 | 7 | 1 | E7 | 0.08 | B | 4.5 | C | 1.8 | B |
| Example 8 | 8 | 1 | E8 | 0.13 | C | 5.5 | C | 1.8 | B |
| Example 9 | 9 | 1 | E9 | 0.14 | C | 5.0 | C | 1.7 | B |
| Example 10 | 10 | 1 | E10 | 0.13 | C | 5.3 | C | 2.5 | C |
| Example 11 | 11 | 1 | E11 | 0.12 | C | 5.3 | C | 2.3 | C |
| Comparative Example 1 | 12 | 1 | E12 | 0.18 | D | 5.8 | C | 2.8 | C |
| Comparative Example 2 | 13 | 1 | E13 | 0.13 | C | 6.5 | D | 3.8 | D |
| Comparative Example 3 | 14 | 1 | E14 | 0.20 | D | 5.5 | C | 3.5 | D |

<Evaluation 1> Evaluating Durable Stability

Using a full color copier imagePRESS C800 (Canon Inc.) as the image-forming device, the cyan developing device of the image-forming device was filled with the two-component developer, which was then evaluated as follows. The copier was modified by removing the mechanism that discharges excess magnetic carrier inside the developer from the developer.

The copier was adjusted so that the toner laid-on level of the toner on the paper in an FFh image (solid image) was 0.45 mg/cm$^2$. FFh is a value obtained by displaying 256 tones in hexadecimal notation, with 00h being the first tone (white background) of 256 tones, and FFh the 256th tone (solid part) of 256 tones.

Conditions:
Paper: CF-081 paper for laser beam printers (81.4 g/m$^2$, Canon Marketing Japan Inc.)
Image formation speed: 85 prints/min with A4 size, full color
Developing conditions: Modified so that the developing contrast could be adjusted to any value, and to disable autocorrection by the main unit. Also modified to change the peak-to-peak voltage of the alternating electric field (Vpp) in 0.1 kV increments between Vpp 0.7 kV and 1.8 kV at a frequency of 2.0 kHz. The image-forming device was modified so that images could be output in a single color for each color.

As a durable image output test, a 10,000-print durable image output test was performed at an image ratio of 40%/o. Each test was performed in a high-temperature, high-humidity environment (30° C., 80% RH). During continuous paper feed in 10,000 prints, paper feed was performed under the same developing conditions and transfer conditions (no calibration) as for the first print.

The image output evaluation items and evaluation standard for the initial print (1st print) and continuous paper feed of 10,000 prints are shown below. The evaluation results are shown in Table 6.

Using an X-Rite color reflection densitometer (500 series: X-Rite Inc.), the image density of the FFh image part (solid part) was evaluated on the initial print (1st print) and the 10,000-th print, and ranked according to the following standard based on the difference Δ between the two image densities. A rank of A to C means that the effects of the invention were obtained.
A: Less than 0.05
B: 0.05 to less than 0.10
C: 0.10 to less than 0.15
D: At least 0.15

<Evaluation 2> Evaluating Image Uniformity

A solid image was output following the 10,000-print durable output test above, a 2 cm-square image was captured under a digital microscope, the captured image was converted to 8-bit gray scale with Image-J (available from https://imagej.nih.gov/ij/), the density histogram was measured, and the standard deviation was determined. The image was then ranked according to the following standard according to the standard deviation value. A rank of A to C means that the effects of the invention were obtained.
A: Standard deviation less than 2.0
B: Standard deviation 2.0 to less than 4.0
C: Standard deviation 4.0 to less than 6.0
D: Standard deviation at least 6.0

<Evaluation 3> Evaluating fogging

An all-white image was output following 10,000-print durable output test above, and the fogging concentration on the paper after durable output testing was measured. The reflectance of the all-white image output after durability testing (%) was measured at 3 points with a MODEL TC-6DS Reflectometer (Tokyo Denshoku Co., Ltd.), and the average value was calculated. The resulting average reflectance value was subtracted from the reflectance (%) of an unused paper sheet (standard paper) measured in the same way, and the resulting value (%) was used to evaluate fogging. The fogging evaluation results were ranked as follows. A rank of A to C means that the effects of the invention were obtained.
A: Fogging density less than 1.0%
B: Fogging density 1.0% to less than 2.0%
C: Fogging density 2.0% to less than 3.0%
D: Fogging density at least 3.0%

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-218795, filed Nov. 22, 2018, Japanese Patent Application No. 2019-191345, filed Oct. 18, 2019 which are hereby incorporated by reference herein in their entirety.

What is claimed is:

1. A magnetic carrier, comprising:
a magnetic carrier particle having a magnetic carrier core particle and a resin coat layer formed on the surface of the magnetic carrier core particle; and
inorganic fine particles A present on a surface of the magnetic carrier particle, inorganic fine particles A being surface treated with a surface treatment agent comprising a fluorine silane coupling agent and an isobutyl silane coupling agent, and having a rectangular parallelepiped particle shape with a number-average particle diameter of 10 to 60 nm, wherein
SP1−SP2≤14.00 when SP1 (J/mol)$^{1/2}$ is the solubility parameter of the resin coat layer and SP2 (J/mol)$^{1/2}$ is the solubility parameter of the surface treatment agent, and
the coverage ratio of the magnetic carrier surface by the inorganic fine particles A as measured by ESCA is 5.0 to 20.0 atom%.

2. The magnetic carrier according to claim 1, wherein SP1 is 18.00 to 20.00 (J/mol)$^{1/2}$.

3. The magnetic carrier according to claim 1, wherein SP2 is 7.00 to 9.00 (J/mol)$^{1/2}$.

4. The magnetic carrier according to claim 1, wherein the dielectric constant of inorganic fine particles A is 25 to 100 pF/m at 25° C., 1 MHz.

5. The magnetic carrier according to claim 1, wherein the true density of inorganic fine particles A is 4.5 to 6.0 g/mL.

6. The magnetic carrier according to claim 1, wherein inorganic fine particles A contain strontium titanate particle.

7. A magnetic carrier according to claim 1, wherein the resin coat layer contains resin A and resin B, resin A being a copolymer of (a) a (meth)acrylic acid ester monomer having an alicyclic hydrocarbon group and (b) a macromonomer containing a polymer portion and a reactive portion bound to the polymer portion, the polymer portion having a polymer of at least one kind of monomer selected from the group consisting of methyl acrylate, methyl methacrylate, butyl acrylate, butyl methacrylate, 2-ethylhexyl acrylate and 2-ethylhexyl methacrylate, and the reactive portion having a reactive C═C double bond, and resin being a copolymer of (c) a styrene monomer and (d) a (meth)acrylic acid ester monomer represented by Formula (2)

where $R_1$ represents H or $CH_3$, and n is an integer from 2 to 8.

8. The magnetic carrier according to claim 7, wherein a molecular weight distribution of the resin coat layer according to gel permeation chromatography contains a peak derived from resin B in the range of molecular weights of 1,000 to 9,500.

9. The magnetic carrier according to claim 1, wherein inorganic fine particle A has a rectangular parallelepiped particle content of 60 to 100 number%.

10. A two-component developer comprising the magnetic carrier according to claim 1 and a toner.

* * * * *